(12) United States Patent
Castello

(10) Patent No.: US 9,855,920 B2
(45) Date of Patent: Jan. 2, 2018

(54) PANORAMIC ROOF PANEL THERMAL MANAGEMENT MODULE OF PANORAMIC ROOF PANEL

(71) Applicant: Yolande Castello, Whitby (CA)

(72) Inventor: Yolande Castello, Whitby (CA)

(*) Notice: Subject to any disclaimer, the term of this patent is extended or adjusted under 35 U.S.C. 154(b) by 544 days.

(21) Appl. No.: 14/495,300

(22) Filed: Sep. 24, 2014

(65) Prior Publication Data

US 2016/0082927 A1    Mar. 24, 2016

(51) Int. Cl.
| | | |
|---|---|---|
| B60L 1/02 | (2006.01) |
| B60S 1/02 | (2006.01) |
| B60S 1/54 | (2006.01) |
| B60S 1/56 | (2006.01) |
| H05B 3/84 | (2006.01) |
| H05B 1/02 | (2006.01) |

(52) U.S. Cl.
CPC ............. *B60S 1/026* (2013.01); *B60S 1/54* (2013.01); *B60S 1/56* (2013.01); *H05B 1/0236* (2013.01); *H05B 3/84* (2013.01)

(58) Field of Classification Search
CPC .... B60S 1/026; B60S 1/54; B60S 1/56; B60S 1/023; B60S 1/0402; B60S 1/0405; B60S 1/0866; B60S 1/544; B60S 1/586; H05B 3/84; H05B 3/86; H05B 3/26; H05B 3/36; H05B 1/0236
See application file for complete search history.

(56) References Cited

U.S. PATENT DOCUMENTS

| | | | |
|---|---|---|---|
| 2,640,231 A | 6/1953 | Jacob | |
| 4,807,523 A * | 2/1989 | Radtke | B60H 1/245 |
| | | | 244/1 R |
| 4,867,216 A | 9/1989 | Mckee | |
| 7,783,400 B1 | 8/2010 | Zimler | |
| 2004/0065651 A1 * | 4/2004 | Voeltzel | B32B 17/10036 |
| | | | 219/203 |
| 2008/0197122 A1 | 8/2008 | Gober | |
| 2010/0038932 A1 | 2/2010 | Comfort et al. | |
| 2010/0282729 A1 | 11/2010 | Taguchi | |
| 2011/0006049 A1 | 1/2011 | Thompson | |
| 2011/0259866 A1 | 10/2011 | Nelson | |
| 2012/0193067 A1 | 8/2012 | Miller | |
| 2012/0193338 A1 | 8/2012 | Sullivan et al. | |

FOREIGN PATENT DOCUMENTS

| | | |
|---|---|---|
| CA | 2547805 | 10/2007 |
| CA | 2633579 | 4/2009 |
| EP | 1236594 | * 2/2002 |

* cited by examiner

*Primary Examiner* — Shawntina Fuqua

(57) ABSTRACT

An apparatus for a panoramic roof panel configured for operative installation to a vehicle roof section of a vehicle, comprising: a panoramic roof panel thermal management module, including: a connection structure configured to connect the panoramic roof panel thermal management module proximate to the panoramic roof panel once the panoramic roof panel thermal management module is installed to the vehicle; and a roof panel heater assembly supported by the connection structure, and the roof panel heater assembly configured to provide heat to the panoramic roof panel once actuated to do just so.

20 Claims, 30 Drawing Sheets

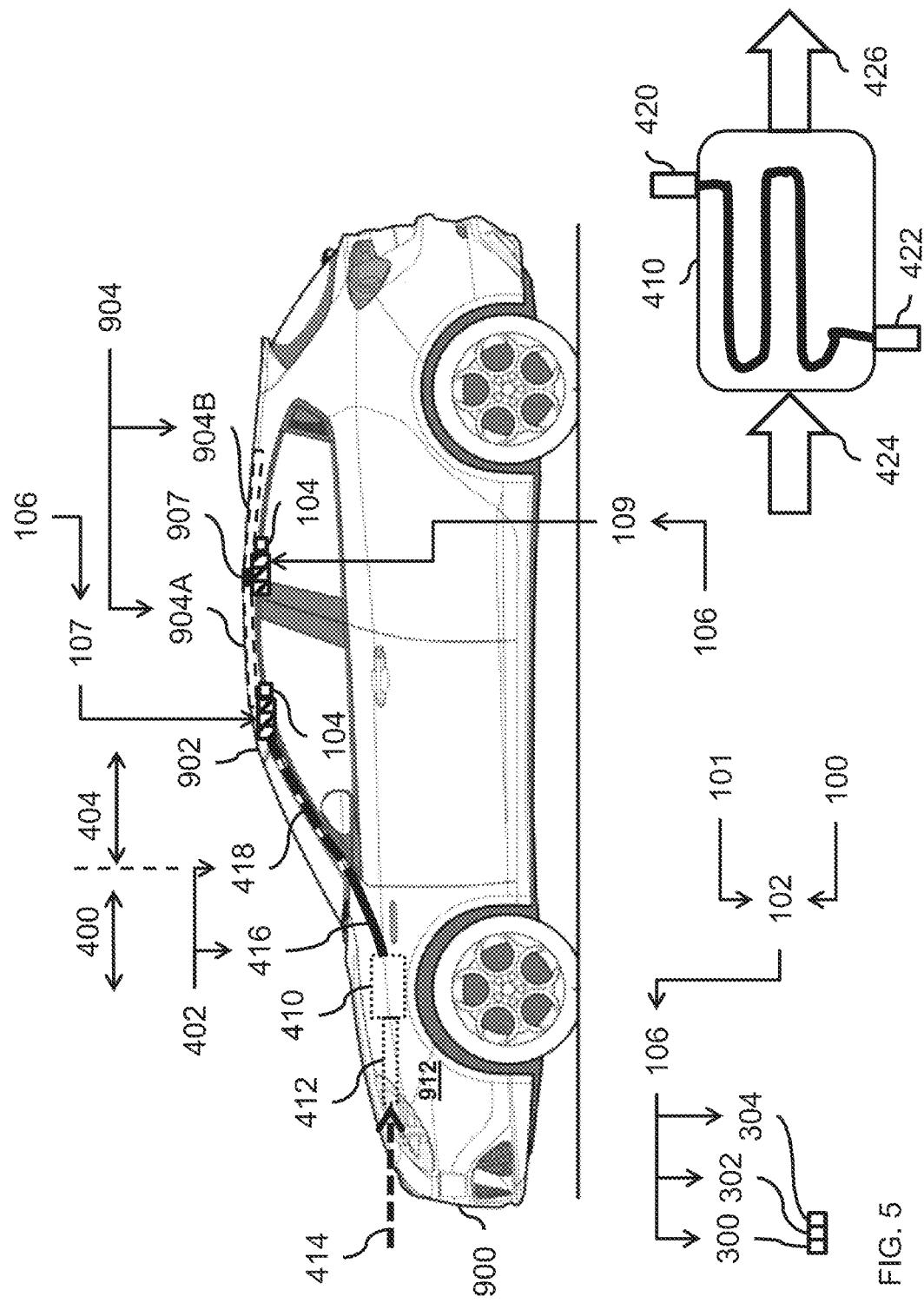

PANORAMIC ROOF PANEL THERMAL MANAGEMENT MODULE OF PANORAMIC ROOF PANEL

TECHNICAL FIELD

Some aspects generally relate to (and are not limited to) a panoramic roof panel thermal management module for a panoramic roof panel.

BACKGROUND

Panoramic roofs have relatively large transparent surfaces, and are installed in vehicles (automobiles). Panoramic roofs make a vehicle's interior seem larger, opening it to the outside world. Some panoramic roofs may cover up to 70 percent of the roof area and may have a retractable shade (liner). Some panoramic roofs are fixedly mounted to the roof of the vehicle and are called fixed transparent modules. Fixedly-mounted panoramic roofs can be fitted from above (top load) or from below (bottom load). Panoramic roofs may be supplied with a shade system (liner). Some panoramic roofs are configured to be opened.

The problem with panoramic roofs is that snow and ice may accumulate on them, and may remain for the entire winter season (depending on climate conditions), and thus the primary functionality of the panoramic roofs may be lost, which is to be able to see through the panoramic roof, on account of accumulated ice and/or snow.

SUMMARY

In view of the foregoing, it will be appreciated that there exists a need to mitigate (at least in part) problems associated with a panoramic roof panel for a vehicle. After much study of the known systems and methods along with experimentation, an understanding of the problem and its solution has been identified and is articulated below.

In order to mitigate, at least in part, the problem(s) identified with existing panoramic roof panels for a vehicle, there is provided (in accordance with an aspect) an apparatus, comprising: a vehicle having a vehicle roof section; a panoramic roof panel configured for operative installation to the vehicle roof section of the vehicle; and a panoramic roof panel thermal management module, including: a connection structure configured to connect the panoramic roof panel thermal management module proximate to the panoramic roof panel once the panoramic roof panel thermal management module is installed to the vehicle; and a roof panel heater assembly supported by the connection structure, and the roof panel heater assembly configured to provide heat to the panoramic roof panel once actuated to do just so.

In order to mitigate, at least in part, the problem(s) identified with existing panoramic roof panels for a vehicle, there is provided (in accordance with an aspect) an apparatus for a panoramic roof panel configured for operative installation to a vehicle roof section of a vehicle, comprising: a panoramic roof panel thermal management module, including: a connection structure configured to connect the panoramic roof panel thermal management module proximate to the panoramic roof panel once the panoramic roof panel thermal management module is installed to the vehicle; and a roof panel heater assembly supported by the connection structure, and the roof panel heater assembly configured to provide heat to the panoramic roof panel once actuated to do just so.

In order to mitigate, at least in part, the problem(s) identified with existing panoramic roof panels for a vehicle, there is provided (in accordance with an aspect) a method for a vehicle having a vehicle roof section, and a panoramic roof panel configured for operative installation to the vehicle roof section of the vehicle, the method comprising connecting a panoramic roof panel thermal management module having a roof panel heater assembly proximate to the panoramic roof panel, and the roof panel heater assembly configured to provide heat to the panoramic roof panel once actuated to do just so and once the panoramic roof panel thermal management module is installed to the vehicle.

In order to mitigate, at least in part, the problem(s) identified above, in accordance with an aspect, there is provided other aspects as identified in the claims.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which:

FIG. 5 depicts a schematic view of a first apparatus and a second apparatus each including a panoramic roof panel thermal management module.

Figure 1A:
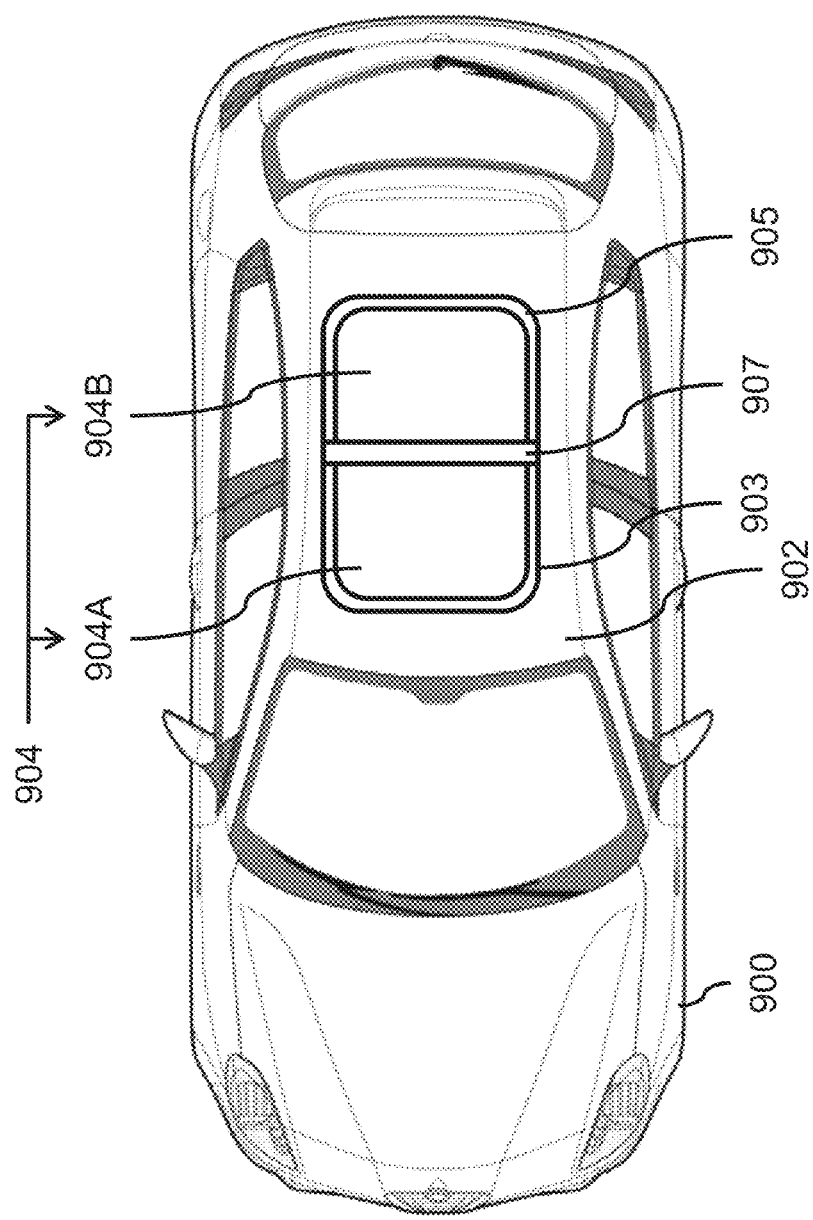
FIGS. 1a to 1d depict schematic views of exemplary embodiments of a vehicle including a panoramic roof panel.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating an understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 100 apparatus, or first apparatus
101 second apparatus 102 panoramic roof panel thermal management module, or module
104 connection structure
106 roof panel heater assembly
107 first roof panel temperature control module
109 second roof panel temperature control module
108 vehicle battery
110 regulator
112 first power control module
114 second power control module
116 alternator
200 flat heating element
201 electric circuit
202 adherent material
203 air flow
204 light-transmissive heating element
206 air-moving device
208 air diffuser device
210 air generator
211 intake pathway
212 fresh air intake
214 air duct
216 air channel
300 air-moving module
302 heat-source module
304A air-diffuser module
304B air-diffuser module
304 air-diffuser module
305 air passageway
306 retractable roof liner section
308 roof liner perimeter
310 latch
311 air intake
313 pathway
315 outflow path
317 pathway
318 virtual boundary layer
320 relatively faster air speed zone
322 relatively slower air speed zone
323 inflow path
324 fan units
325 outflow path
326 blower units
327 blower outlet
329 blower inlet
331 blower motor
332 electric circuit
333 blower blades
334 electric circuit
336 electric circuit
338 forced air generator
340 front air duct
342 front air channel
344 rear air channel
346 rear air duct
400 first stage
402 conduit structure
404 second stage
410 pre-heating device
412 fresh air intake
414 pathway
416 air duct
418 air channel
420 fluid inlet
422 fluid outlet
424 air inlet
426 air outlet 900 vehicle
901 chassis ground
902 vehicle roof section
903 first frame section
904A first panoramic roof panel
904B second panoramic roof panel
904 panoramic roof panel
905 second frame section
906 interior-facing surface
907 divider structure
908 outer-facing surface
909A front cover panel
909B rear cover panel
912 engine block
913 boundary layer
914 vehicle frame
916 air gap
950 snow and/or ice
952 air flow direction

DETAILED DESCRIPTION OF THE EXEMPLARY EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the embodiment (examples) as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a". The aspects (examples, alterations, modifications, options, variations, embodiments and any equivalent thereof) are described with reference to the drawings. It should be understood that the invention is limited to the subject matter provided by the claims, and that the invention is not limited to the particular aspects depicted and described.

FIGS. 1a to 1d depict schematic views of exemplary embodiments of a vehicle 900 including a panoramic roof panel 904.

FIG. 1a depicts an embodiment of a top view of the vehicle 900 having the vehicle roof section 902 in which the panoramic roof panel 904 is installed therein or thereto. The panoramic roof panel 904 may also be called a light-transmissive roof panel. In accordance with the exemplary embodiments of FIGS. 1a, 1b, 1c and 1d, the panoramic roof panel 904 includes the first panoramic roof panel 904A (also called a front section shown in a closed condition), and the second panoramic roof panel 904B (also called a rear section shown in a closed condition). Of course, in accordance with the options of the exemplary embodiments of FIGS. 1a, 1b, 1c and 1d, the panoramic roof panel 904 may include any one of the first panoramic roof panel 904A, the second panoramic roof panel 904B, or the combination of both the first panoramic roof panel 904A and the second panoramic roof panel 904B. The panoramic roof panel 904 may be movable once installed to the vehicle roof section 902, or may be fixedly positioned relative to the vehicle roof section 902 of the vehicle 900. The first panoramic roof panel 904A includes a first frame section 903. The second panoramic roof panel 904B includes a second frame section 905. A divider structure 907 is positioned between the first panoramic roof panel 904A and the second panoramic roof panel 904B, and may be operatively connectable to the vehicle roof section 902.

The vehicle 900 may include, for example, a mobile machine that transports passengers and/or cargo (such as wagons, bicycles, motor vehicles, motorcycles, cars, trucks, buses, trains, etc., watercraft, ships, boats, etc., spacecraft and aircraft). Land vehicles are classified broadly by what is used to apply steering and drive forces against the ground (wheeled, tracked, railed or skied). ISO 3833-1977 is the standard, also internationally used in legislation, for road vehicles types, terms and definitions.

The panoramic roof panel 904 is a fixed or operable (venting or sliding) opening in a vehicle roof (such as, an automobile roof) configured to allow light and/or fresh air to enter the passenger compartment of the vehicle. The panoramic roof panel 904 may be manually operated or may be motor driven. The panoramic roof panel 904 may also be called a panoramic roof system, and may include a single panel or multiple panels that offer openings above both the front and rear seats (or above the front only or above the rear seat only), and may be operable or fixed glass panels. For instance, the panoramic roof panel 904 configured for operable opening may include top-slider (tracks in the top of the vehicle roof section 902 of the vehicle 900) or may include spoiler type mechanisms.

Figure 1B:
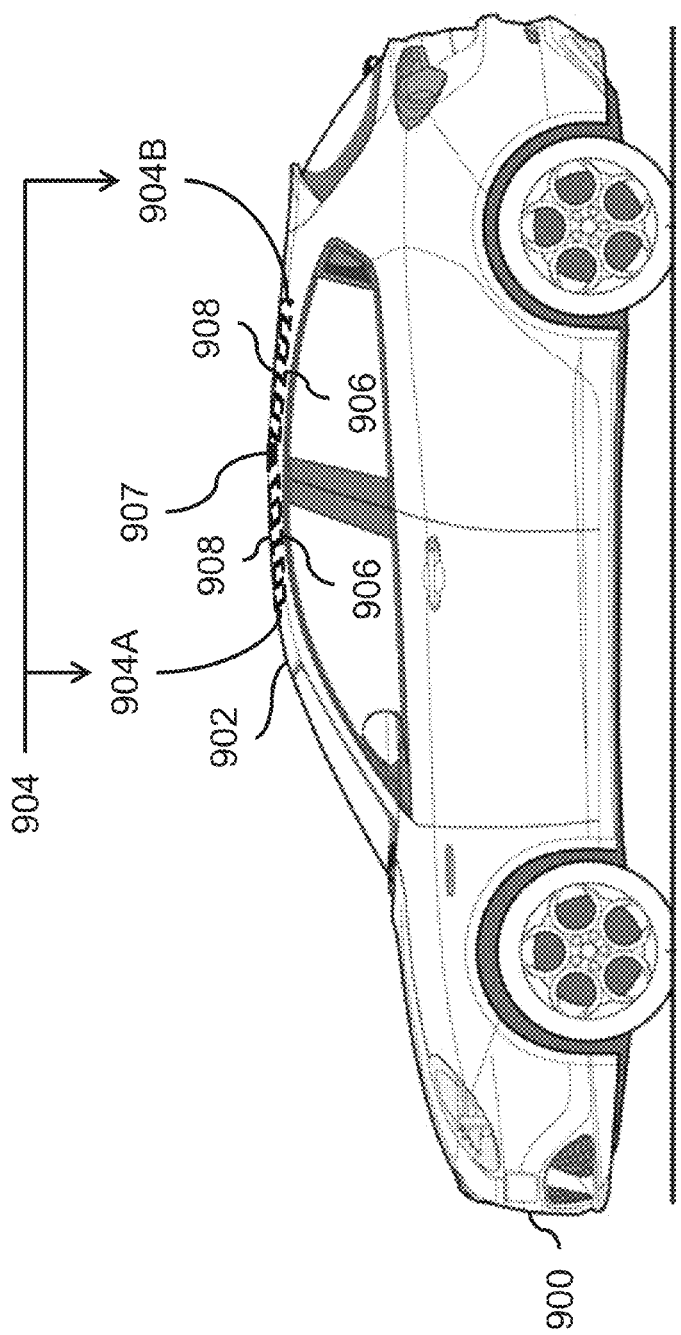

FIG. 1b depicts an embodiment of a side view of the vehicle 900 having the vehicle roof section 902 in which the panoramic roof panel 904 is installed therein or thereto. It will be appreciated that the panoramic roof panel 904 includes an interior-facing surface 906, and an outer-facing surface 908 spaced apart from the interior-facing surface 906.

It will be appreciated that a roof liner (known and not depicted in FIG. 1c) may be installed in the vehicle roof section 902, and is configured to selectively cover and uncover the panoramic roof panel 904 (as may be required, if so required).

Figure 1C:
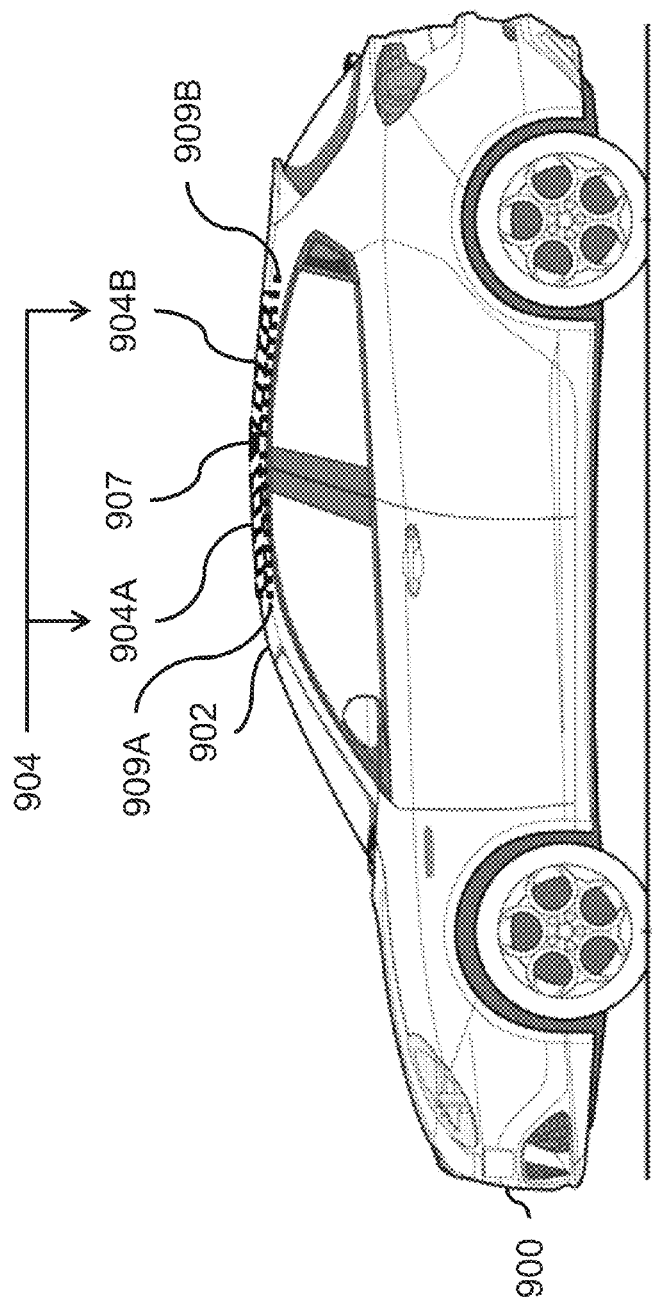

FIG. 1c depicts an embodiment of a side view of the vehicle 900 having the vehicle roof section 902 in which the panoramic roof panel 904 is installed therein or thereto. A front cover panel 909A (also called a front liner panel) is installed to the vehicle roof section 902, and is configured to selectively cover and uncover the first panoramic roof panel 904A in response to control by an end user. A rear cover panel 909B (also called a rear liner panel) is installed to the vehicle roof section 902, and is configured to selectively cover and uncover the second panoramic roof panel 904B in response to control by an end user. The first frame section 903 (depicted in FIG. 1a) and the second frame section 905 (depicted in FIG. 1a) are configured to interact with the front cover panel 909A and the rear cover panel 909B, respectively. The divider structure 907 (also called a center divider) may provide a position or location where a panoramic roof panel thermal management module 102 may be placed (located) as explained below in connection to the remaining FIGS. that depict the module 102. The divider structure 907 may or may not be provided in some types of the vehicle 900.

Figure 1D:
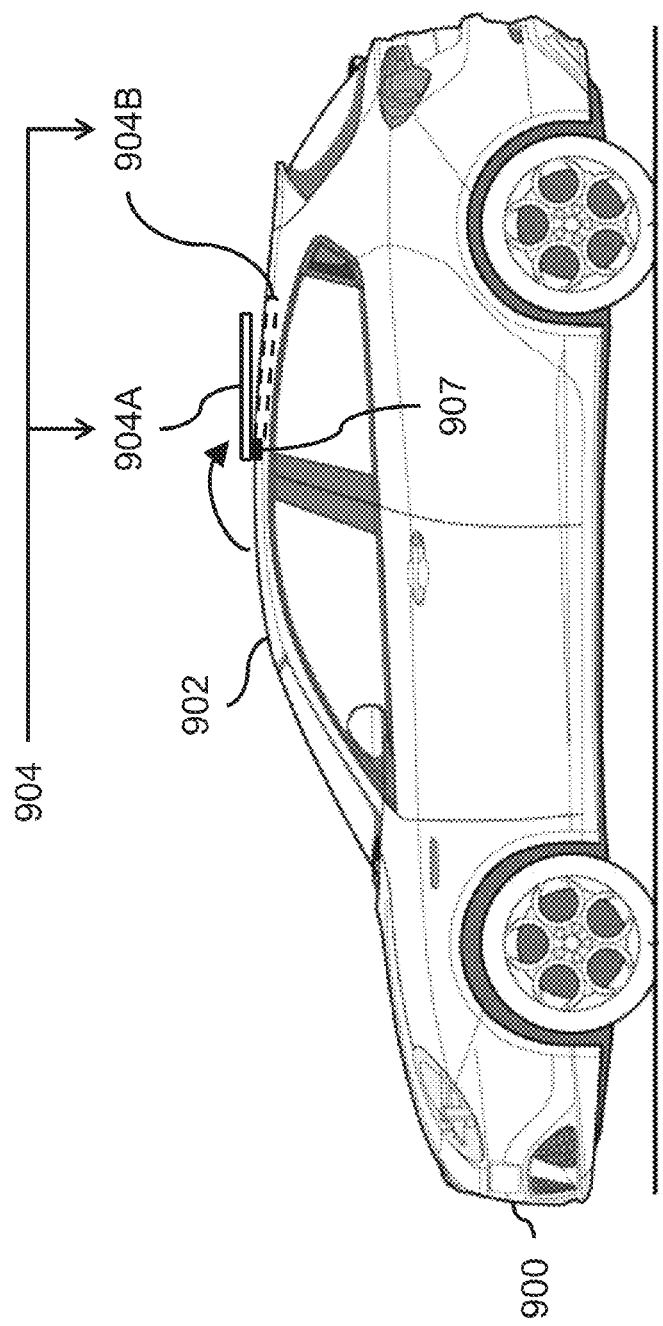

FIG. 1d depicts an embodiment of a side view of the vehicle 900 having the vehicle roof section 902 in which the panoramic roof panel 904 is installed therein or thereto. In accordance with FIG. 1d, the first panoramic roof panel 904A is depicted in an open condition (open state). In accordance with FIG. 1c, the first panoramic roof panel 904A is depicted in a closed condition (a closed state).

Figure 2:
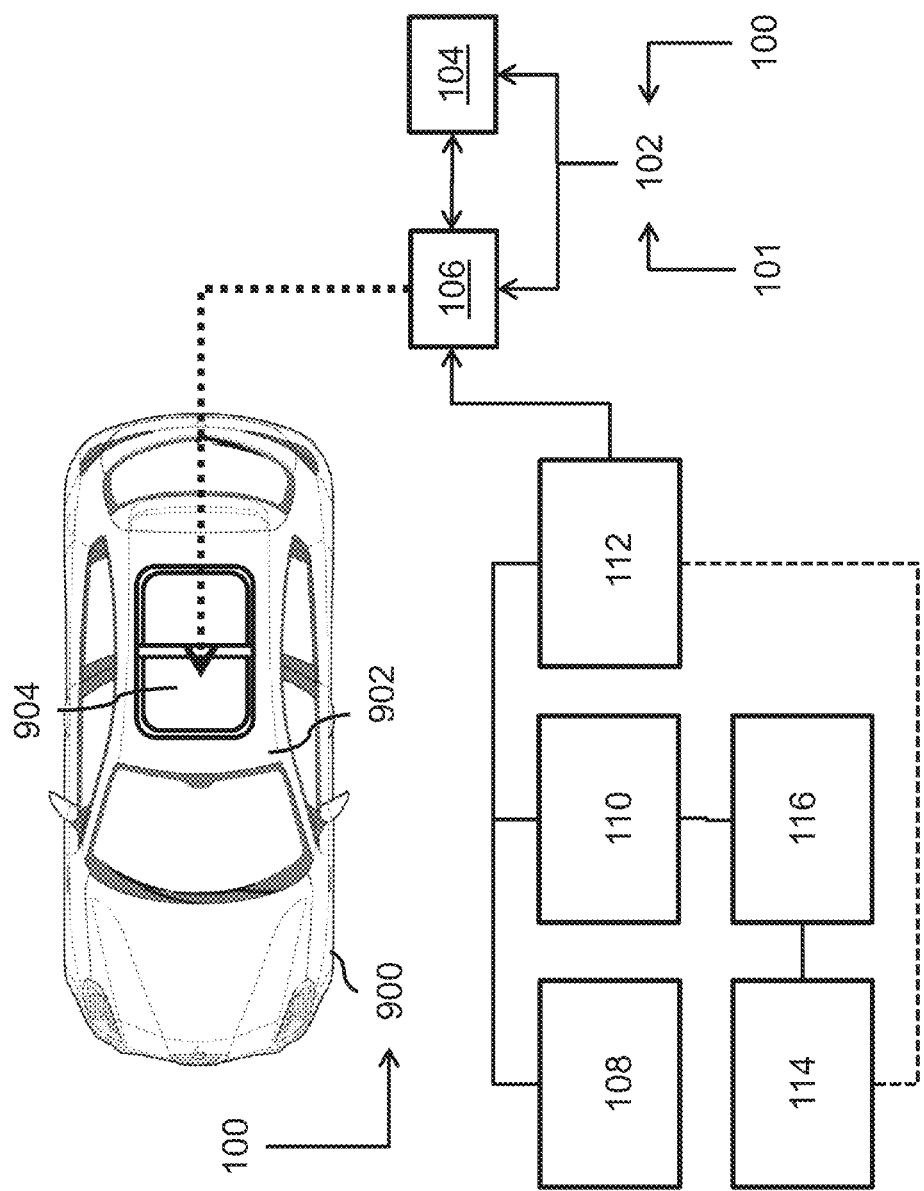
FIG. 2 depicts a schematic view of a first apparatus and a second apparatus each including a panoramic roof panel thermal management module.

FIG. 2 depicts a schematic view of an example of a first apparatus 100 and a second apparatus 101 each including a panoramic roof panel thermal management module 102.

In accordance with the embodiment of FIG. 2, it will be appreciated that the panoramic roof panel 904 includes the interior-facing surface 906 (also shown in FIG. 1b) and the outer-facing surface 908 (shown in FIG. 1b) spaced apart from the interior-facing surface 906. The panoramic roof panel 904 may be called a light-transmissive roof panel.

In accordance with the embodiment of FIG. 2, there is depicted (in general terms) a first apparatus 100. The first apparatus 100 includes (and is not limited to) a combination of a vehicle 900, a panoramic roof panel 904, and a panoramic roof panel thermal management module 102. The vehicle 900 has a vehicle roof section 902. The panoramic roof panel 904 is configured for operative installation to the vehicle roof section 902 of the vehicle 900. The panoramic roof panel thermal management module 102 is hereafter referred to as the module 102 (for convenience). The module 102 includes (in general terms) a combination of a connection structure 104 and a roof panel heater assembly 106. The connection structure 104 is configured to connect the module 102 proximate to the panoramic roof panel 904 once the module 102 is installed to the vehicle 900. The roof panel heater assembly 106 is supported by the connection structure 104. The roof panel heater assembly 106 is configured to provide heat to the panoramic roof panel 904 once actuated to do just so. The roof panel heater assembly 106 may also be called a defroster assembly, or a thermal-management assembly.

In accordance with the embodiment of FIG. 2, there is depicted (in general terms) a second apparatus 101. The second apparatus 101 is for a panoramic roof panel 904 configured for operative installation to a vehicle roof section 902 of a vehicle 900. The second apparatus 101 includes (and is not limited to) a panoramic roof panel thermal management module 102 (also called the module 102). The module 102 includes (in general terms) a combination of a connection structure 104 and a roof panel heater assembly 106. The connection structure 104 is configured to connect the module 102 proximate to the panoramic roof panel 904 once the module 102 is installed to the vehicle 900. The roof panel heater assembly 106 is supported by the connection structure 104. The roof panel heater assembly 106 is configured to provide heat to the panoramic roof panel 904 once actuated to do just so. It will be appreciated that the second apparatus 101 does not include the vehicle 900, the vehicle roof section 902 and/or the panoramic roof panel 904.

In view of the foregoing, there is also provided a method for a vehicle 900 having a vehicle roof section 902, and a panoramic roof panel 904 configured for operative installation to the vehicle roof section 902 of the vehicle 900; the method includes (and is not limited to) connecting a panoramic roof panel thermal management module 102 having a roof panel heater assembly 106 proximate to the panoramic roof panel 904, and the roof panel heater assembly 106 configured to provide heat to the panoramic roof panel 904 once actuated to do just so and once the panoramic roof panel thermal management module 102 is installed to the vehicle 900.

Of course, it will be appreciated that the module 102 may be configured for interaction with any one of the first panoramic roof panel 904A, the second panoramic roof panel 904B, or the combination of the first panoramic roof panel 904A and the second panoramic roof panel 904B.

The first apparatus 100 or the second apparatus 101 provides the module 102, and the module 102 is configured to provide a defrosting effect (of sufficient strength and ability) to soften and/or to melt ice and/or snow positioned on the panoramic roof panel 904. The module 102 provides a relatively convenient means for removing ice and/or snow from the panoramic roof panel 904 for the users (drivers and passengers) of the vehicle 900, and/or improved safety to the vehicle 900, and/or improved road traffic safety.

The roof panel heater assembly 106 may obtain the required energy from systems and/or assemblies mounted to the vehicle 900, such as: a vehicle battery 108, a regulator 110, a first power control module 112, a second power control module 114, and/or an alternator 116. For instance, the vehicle battery 108 is operatively connected to the regulator 110. The first power control module 112 is operatively connected to the regulator 110. The alternator 116 is operatively connected to the regulator 110. The second power control module 114 is operatively connected to the alternator 116. The first power control module 112 is operatively connected to the roof panel heater assembly 106 of the module 102.

In accordance with an option, the first power control module 112 is configured to provide (to the roof panel heater assembly 106 of the module 102) a timer, a relay and switching circuit, a circuit protection, a safety protection, power control devices, and power (that is, power to be used for generating a heat effect and/or a cooling effect to be applied to the panoramic roof panel 904). In this way, the thermal management of the panoramic roof panel 904 may be accomplished.

In accordance with another option, the first power control module 112 is configured to provide (to the roof panel heater assembly 106 of the module 102) a feedback/sense control signal indicating an amount of power or power control needed for heating the panoramic roof panel 904.

In accordance with yet another option, the first power control module 112 is configured to provide (to the roof panel heater assembly 106 of the module 102) scalability of power that may be needed based on the modules and assemblies used in the module 102 for the purpose of heating the panoramic roof panel 904.

The second power control module 114 is configured to provide feedback control to (and/or a signal to) the alternator to generate the require power that may be required or needed for heating the panoramic roof panel 904.

It will be appreciated that (for the retrofit market) for older types or current types of the vehicle 900, the second power control module 114 and the first power control module 112 may be removed and/or adapted accordingly, if so desired, to suit these types of the vehicle 900.

Further below, there are described three specific embodiments of the general embodiment depicted in FIG. 2. It will be appreciated that each of the embodiments provides softening and/or melting of ice and/or snow positioned on the panoramic roof panel 904; each of the embodiments may require different options and assemblies that may address different design requirements. It will be appreciated that other options may be possible and may be within the scope of the embodiment associated with FIG. 2.

For instance, a first detailed embodiment is depicted in FIGS. 3a to 3g, in which the module 102 includes heating elements and a material adherent configured to adhere the heating element to the panoramic roof panel 904; once the heating element is energized with electrical current, the heating element heats up and passes the heating effect to the panoramic roof panel 904; in this manner, the heat received by the panoramic roof panel 904 may be used to soften and/or melt the ice and/or snow that is placed on the panoramic roof panel 904.

For instance, a second detailed embodiment is depicted in FIGS. 4a to 4k, in which the module 102 includes heater elements with a forced-air generator configured to provide forced air flow; the forced-air generator is mounted in an interior of the vehicle 900, and is configured to provide a heating effect to the panoramic roof panel 904 in such a way as to soften and/or melt the ice and/or snow positioned (placed) on the panoramic roof panel 904.

For instance, a third detailed embodiment is depicted in FIG. 5, in which the module 102 includes a combination of a first stage (preheating if air provided from an engine block of the vehicle 900), and a second stage (an additional heater element with a forced-air generator for additional heating); the third embodiment may be somewhat more efficient than the second embodiment but with more structural and/or functional complexity added than the second embodiment.

FIGS. 3a to 3g depict schematic views of exemplary embodiments of a first apparatus 100 and a second apparatus 101 each including a panoramic roof panel thermal management module 102.

In accordance with the exemplary embodiments of FIGS. 3a to 3g, it will be appreciated that the panoramic roof panel 904 includes the interior-facing surface 906 (shown in FIG. 1b) and the outer-facing surface 908 (also shown in FIG. 1b) spaced apart from the interior-facing surface 906.

In accordance with the exemplary embodiments of FIGS. 3a to 3g, the panoramic roof panel 904 includes the first panoramic roof panel 904A (front section) and the second panoramic roof panel 904B (rear section). Of course, in accordance with other options of the exemplary embodiments of FIGS. 3a to 3g, the panoramic roof panel 904 may include any one of the first panoramic roof panel 904A (front section), the second panoramic roof panel 904B (rear section), or the combination of both the first panoramic roof panel 904A (front section) and the second panoramic roof panel 904B (rear section).

Figure 3A:
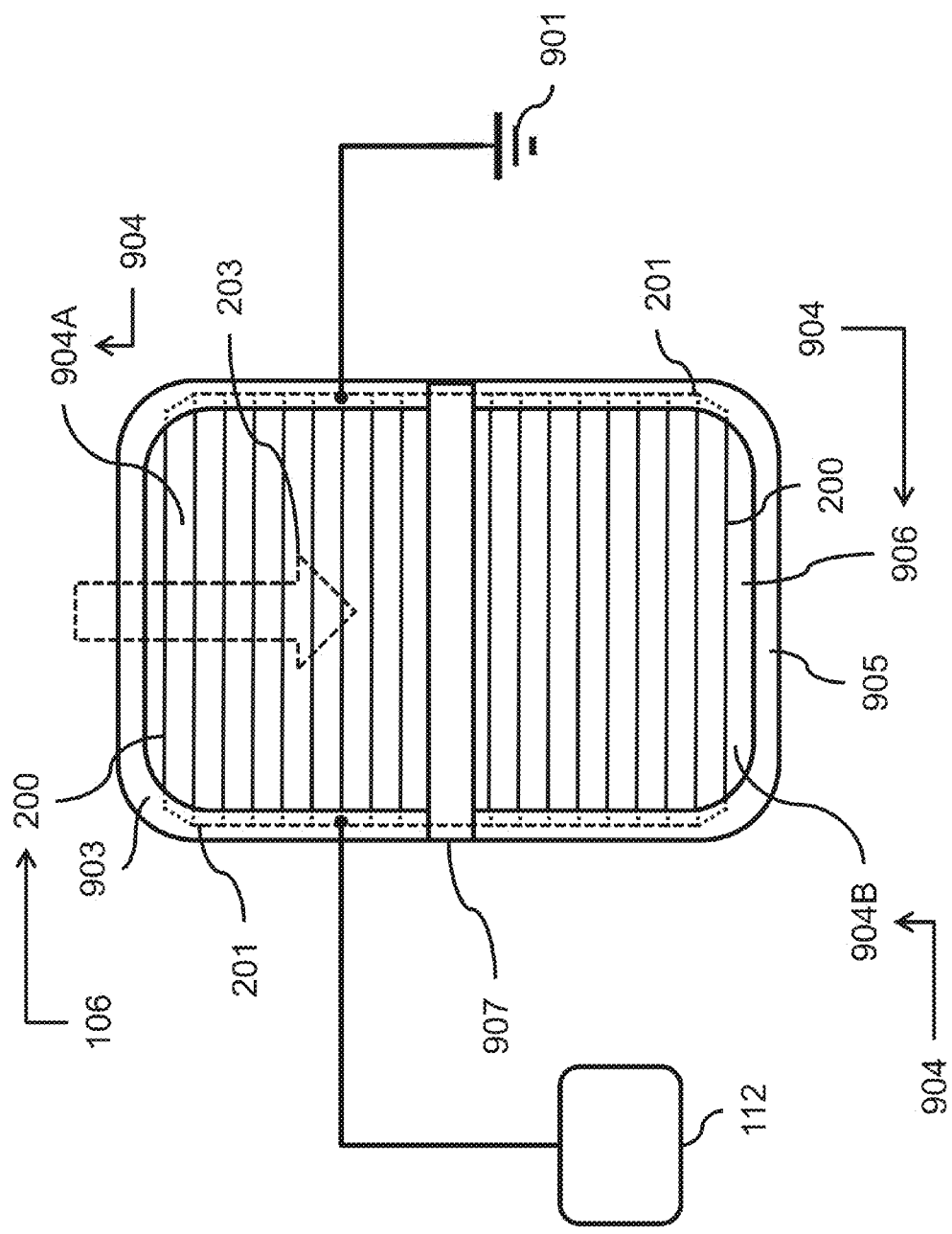
FIGS. 3a to 3g depict schematic views of exemplary embodiments of a first apparatus and a second apparatus each including a panoramic roof panel thermal management module.
Figures 1, 3A:
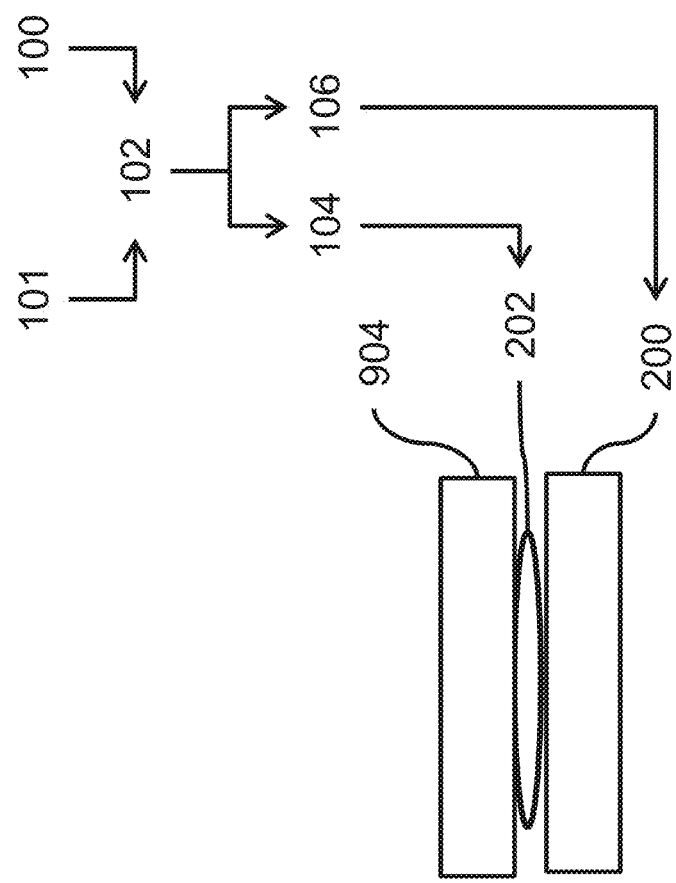
Figure 3B:
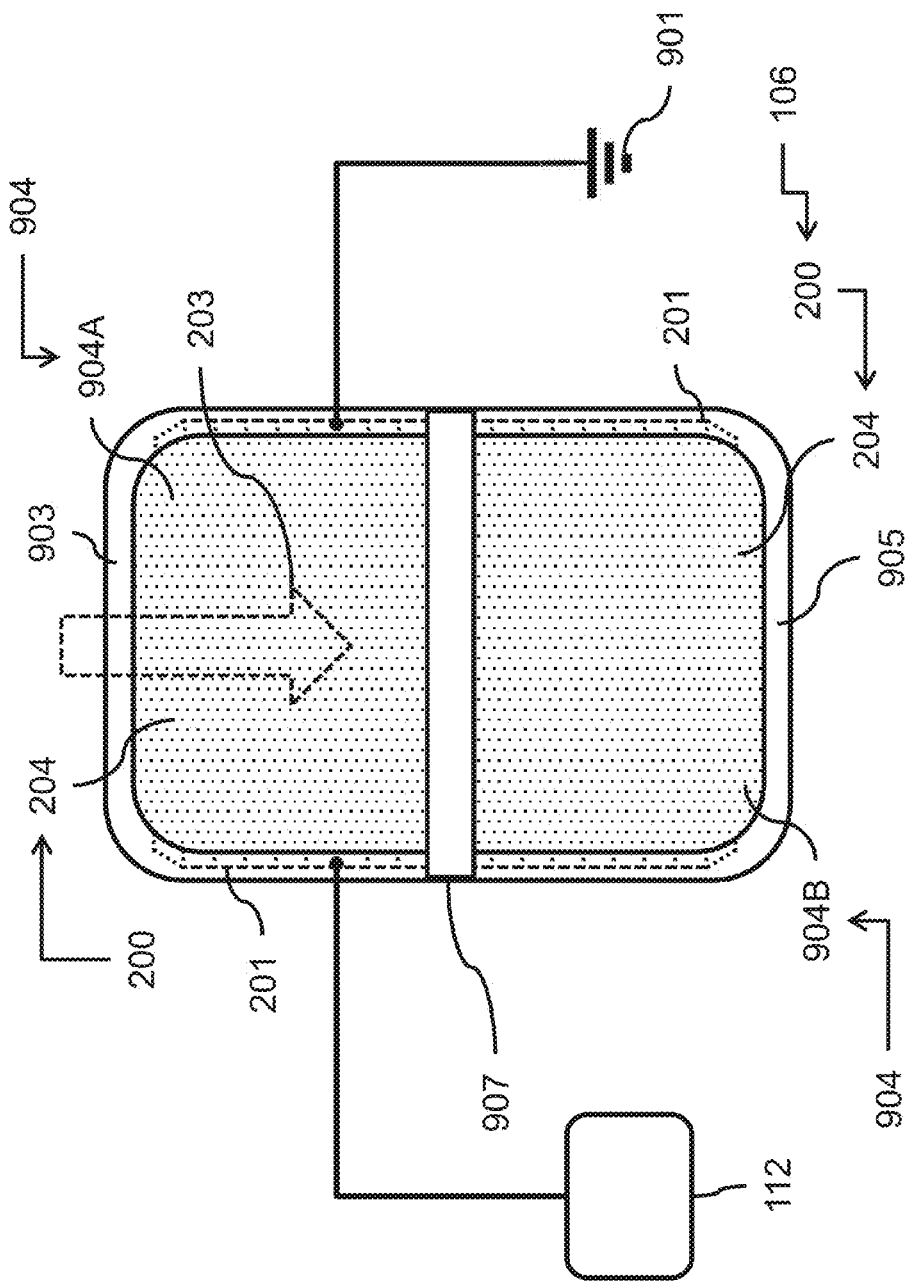

FIGS. 3a and 3b depict top views of embodiments of module 102 installed to the panoramic roof panel 904. In accordance with FIGS. 3a and 3b, the first apparatus 100 is adapted such that: (A) the roof panel heater assembly 106 includes a flat heating element 200; and (B) the connection structure 104 includes an adherent material 202. The adherent material 202 is configured to adhere (bonding by chemical means and/or by mechanical means) the flat heating element 200 to the interior-facing surface 906 of the panoramic roof panel 904. The flat heating element 200 is configured to convey a heat effect to the panoramic roof panel 904; in response, the interior-facing surface 906 of the panoramic roof panel 904 receives the heat from the flat heating element 200, and then the heat is conveyed from the interior-facing surface 906 to the outer-facing surface 908 of the panoramic roof panel 904; this is done in such a manner (in such a way) that the heat conveyed to the outer-facing surface 908 is sufficient enough to soften, at least in part, ice and snow resting on the outer-facing surface 908 of the panoramic roof panel 904. The flat heating element 200 may be called the integrated heating element.

In accordance with FIG. 3*a* (showing a top view) and FIG. 3*a*-1 (showing a side view), the flat heating element 200 includes (as depicted) a grouping of heating lines (also called heating wires or heating strips) that are spaced apart from each other, and are aligned or span across the inner surface of the panoramic roof panel 904 (span vertically across or span horizontally across, etc.).

The first power control module 112 is operatively connected to the instances of the flat heating element 200 of FIG. 3*a* via an electric circuit 201. The electric circuit 201 may be called the power bus bars. The electric circuit 201 operatively connects the opposite ends of each instance of the flat heating element 200 to the first power control module 112 and to the chassis ground 901 of the vehicle 900. Instances of the flat heating element 200 are adhered to the bottom surface (that is, the surface facing the interior of the vehicle 900) of the panoramic roof panel 904, and are configured to provide a heating effect to the panoramic roof panel 904 (once activated to do just so). The flat heating element 200 may include a silver-ceramic material (or similar or equivalent heating elements and/or materials) that may be printed and baked onto the panoramic roof panel 904. The flat heating element 200 may be configured to increase (at least in part) the temperature of panoramic roof panel 904 in such a way as to soften and/or melt the ice and/or snow positioned on the panoramic roof panel 904. The flat heating element 200 may have materials of a low cost and/or a relatively longer operative life (that is, a relatively higher mean time between failures), may be robust and compliant to automobile safety, operation and environmental standards, etc. It will be appreciated that additional instances of the flat heating element 200 may be added for an extended version of the panoramic roof panel 904 or for separate instances of the panoramic roof panel 904 (depending on defrosting operating requirements). The instances of the flat heating element 200 may need to have controls that monitor sensors and circuit protection to ensure proper operation of the module 102 while providing safety for the driver and passengers in the vehicle 900, and also protect the vehicle 900 from damage.

It will be appreciated that an air flow 203 may be induced or generated to flow along the interior surface of the panoramic roof panel 904, thereby reducing the occurrence of the formation of condensation on the panoramic roof panel 904.

The first power control module 112 is configured to provide power and control to the flat heating element 200. The first power control module 112 may be configured to operatively control a sufficient number of the flat heating elements 200, may need to be relatively faster acting in response to defroster operation requirements, may need to be of a relatively lower cost, may be of a relatively longer life, and may be robust and compliant to automobile safety, operation and environmental standards.

In accordance with FIG. 3*b*, the flat heating element 200 includes (as depicted) a light-transmissive heating element 204. The light-transmissive heating element 204 includes an electrically-conductive sheet embedded in the panoramic roof panel 904, and is also light-transmissive. The light-transmissive heating element 204 may also be called an integrated heating element. The light-transmissive heating element 204 includes a clear (such as, transparent or translucent or see-through to some degree) heating element. It will be appreciated that an additional amount of the light-transmissive heating element 204 may be applied to an extended version of the panoramic roof panel 904 or to separate instances of the panoramic roof panel 904 depending on the required defrost operating requirements.

For instance, in extreme cold environments (such as, commercial aircraft and military vehicles/aircraft industry), the light-transmissive heating element 204 may include a material such as indium tin oxide (ITO) of the type used for applying a heat effect to liquid crystal displays (LCDs) or to light emitting diode (LED) displays (such as of the type used in commercial and/or military environments). In addition, carbon nanotubes, graphene, and other materials and/or compounds that are clear or transparent or translucent, etc., may be used and may provide low resistances and a relatively lower cost and/or a relatively higher performance heating effect, and hence increase the temperature of the panoramic roof panel 904 as may be required. It will be appreciated that a clear material and/or a transparent material may be see-through and may not likely block or limit sunlight and/or street light, and may not likely obstruct driver and/or passenger viewing of the environment external to the vehicle 900. The light-transmissive heating element 204 may be of a relatively lower cost, a relatively longer operative life span, and robust and compliant to automobile safety, operation and environmental standards.

In accordance with the exemplary embodiments of FIGS. 3*c* to 3*g*, the module 102 includes instances of the flat heating element 200 integrated with (embedded to, attached to) the panoramic roof panel 904.

Figure 3C:
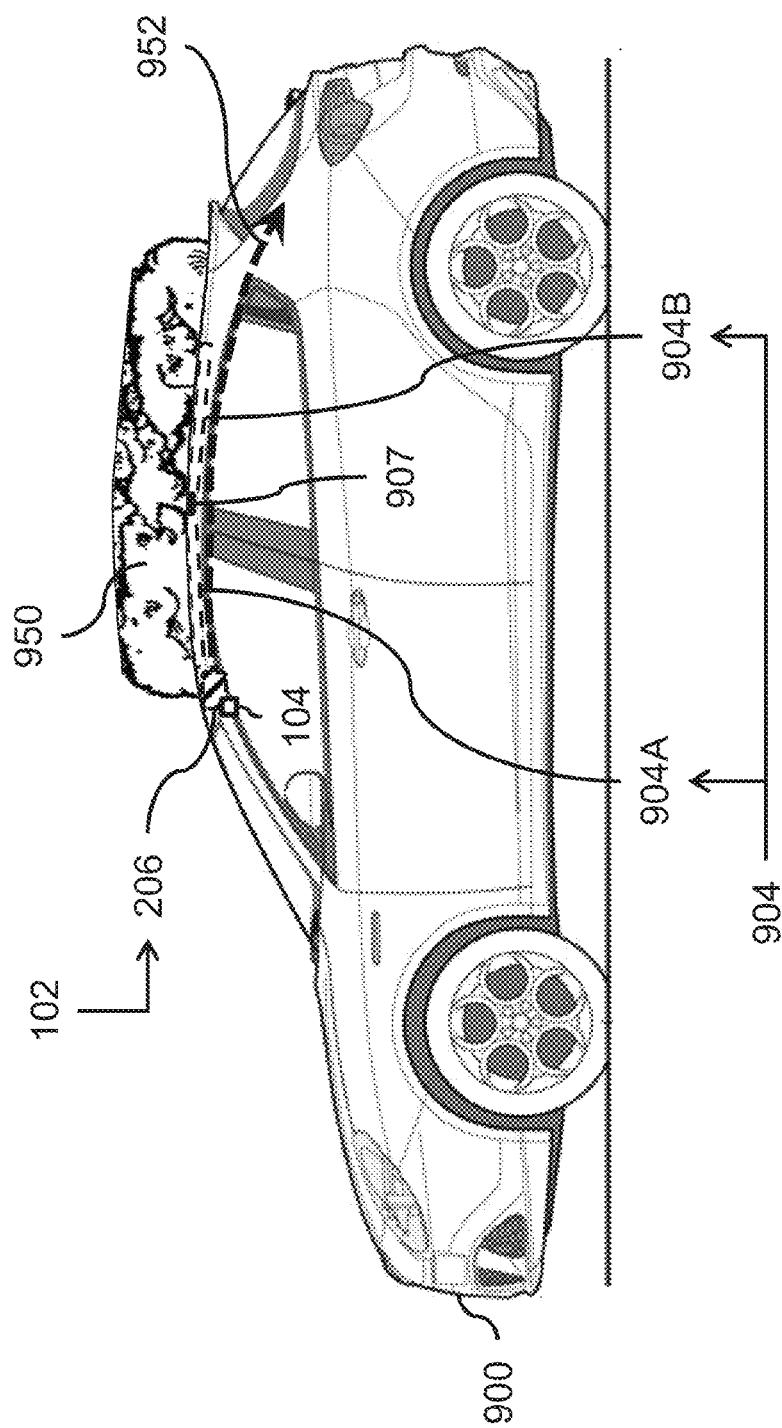
Figure 3D:
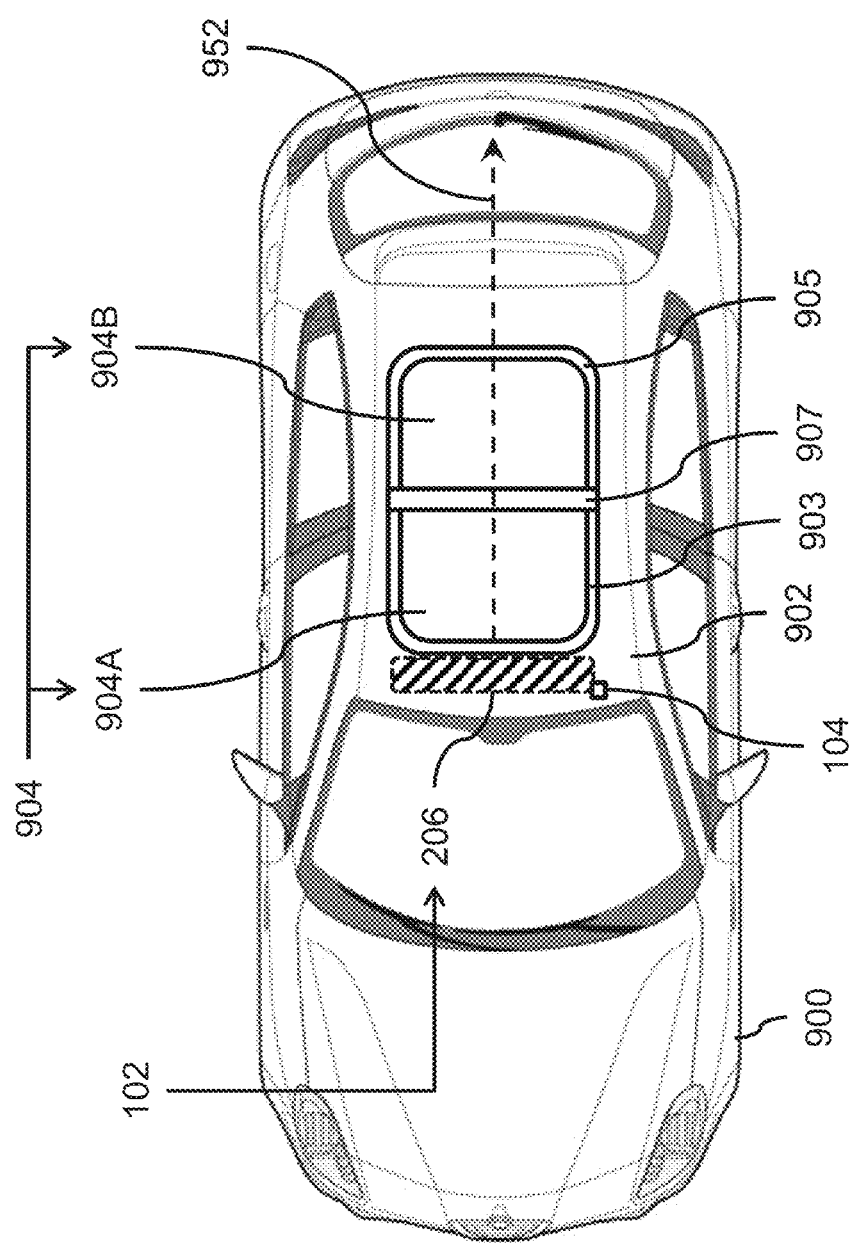

Referring to the embodiments of FIGS. 3*c* and 3*d* (showing a side view and a top view, respectively), the module 102 further includes an air-moving device 206 (also called a fan unit or a blower unit) configured to generate and direct a flow of air to be directed toward the inner facing surface (that faces the vehicle interior) of the panoramic roof panel 904. Generally, the air-moving device 206 is configured to generate and direct a flow of air to be directed toward the inner facing surface of the panoramic roof panel 904 for condensation mitigation. For instance, condensation may occur when the right combination of humidity and temperature exist to cause the formation of water droplets on the interior surface or inner facing surface of the panoramic roof panel 904 in the vehicle 900. The air-moving device 206 may include at least one or more fans or blowers. The air-moving device 206 is mounted proximate to a top section of the front windshield of the vehicle 900 in such a way that condensation may be controlled (reduced or eliminated). The air-moving device 206 is configured to cause or urge movement of air along an air flow direction 952 along a pathway for flow of heated (treated) air that passes by the inner facing surface of the first panoramic roof panel 904A and the second panoramic roof panel 904B. The air-moving device 206 is configured to generate sufficient air flow in such a way that the occurrence of condensation on the panoramic roof panel 904 is reduced (at least in part). An additional heating system for FIG. 3*c* may not be required since the heat generated by the flat heating element 200 of FIG. 3*a* or 3*b* may be sufficient. The air-moving device 206 is configured to generate sufficient air flow to mitigate (at least in part) the development of condensation on the panoramic roof panel 904; for instance, a delay timer and a sensor (humidity, temperature, condensation) may be included with the air-moving device 206 to assist in the control or management of the condensation formed on the panoramic roof panel 904. The air-moving device 206 is configured to operate efficiently (at least in part) and/or to operate when the instances of the flat heating element 200 (depicted in FIGS. 3*a* and 3*b*) have sufficient time to heat up and have time to soften and/or melt the ice and snow 950; it will be appreciated that starting the air flow prematurely may reduce the efficiency of the air-moving device 206 and may require a longer time to manage the temperature of the panoramic roof panel 904 and/or the humidity condition surrounding the panoramic roof panel 904. In general terms, the air-moving device 206 is configured for management of condensation formed on the panoramic roof panel 904.

Figure 4A:
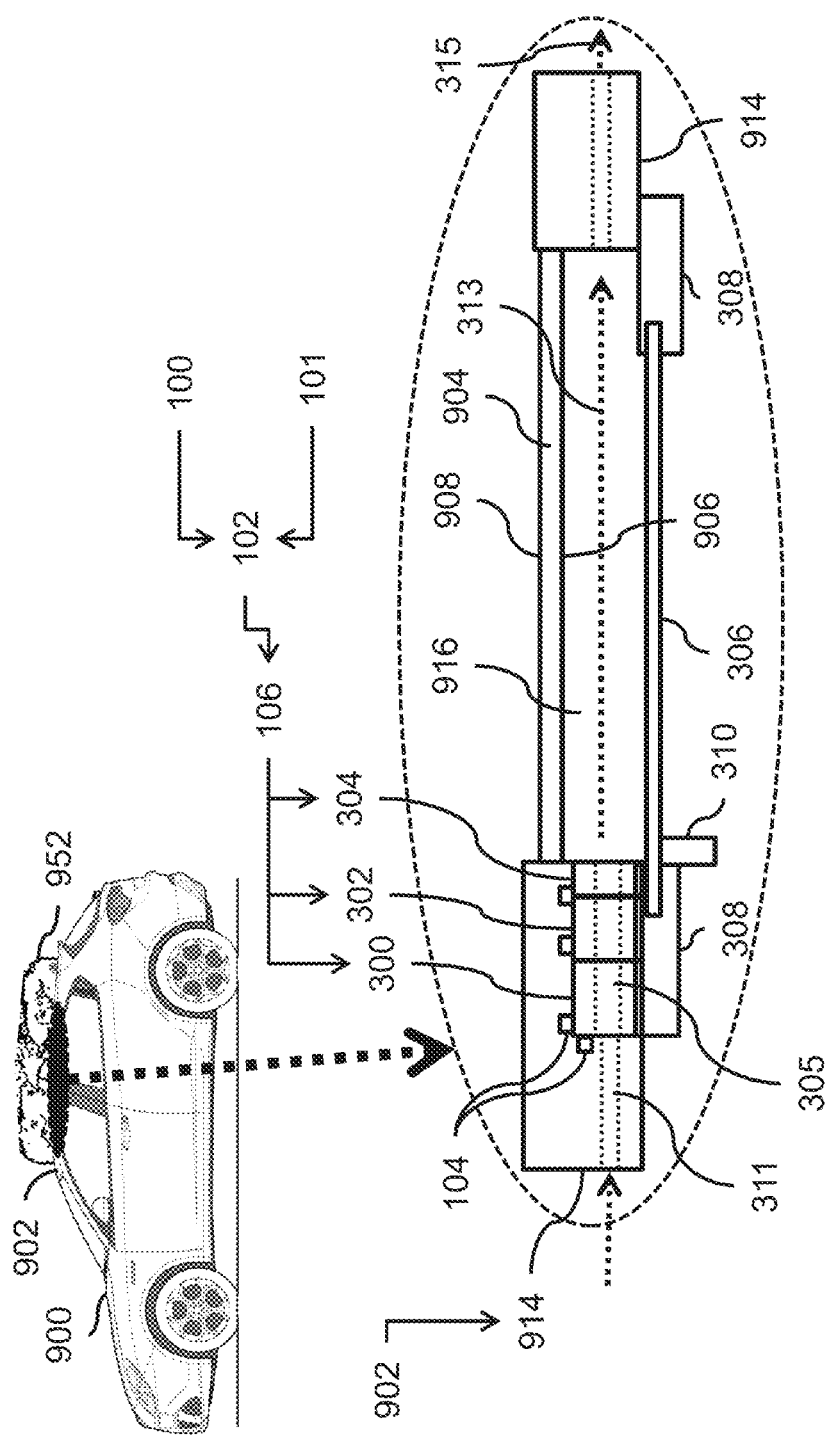
FIGS. 4a to 4k depict schematic views of exemplary embodiments of a first apparatus and a second apparatus each including a panoramic roof panel thermal management module.
Figure 4A:
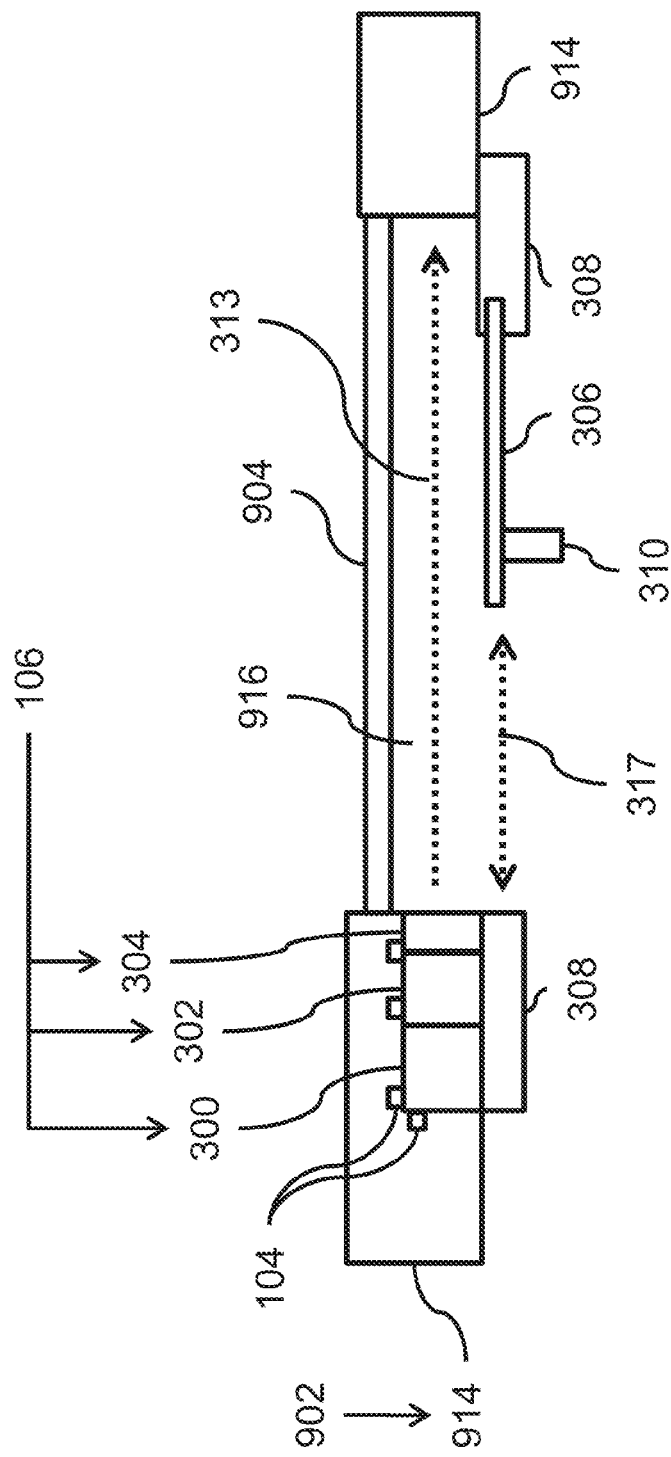

For the case where a roof liner is used with the panoramic roof panel 904 (as depicted in FIG. 4*a* for instance), the air flow may be set up between a bottom surface of the panoramic roof panel 904 and a top surface of a roof liner. An amount of ice and snow 950 is positioned on the first panoramic roof panel 904A and the second panoramic roof panel 904B.

Figure 3E:
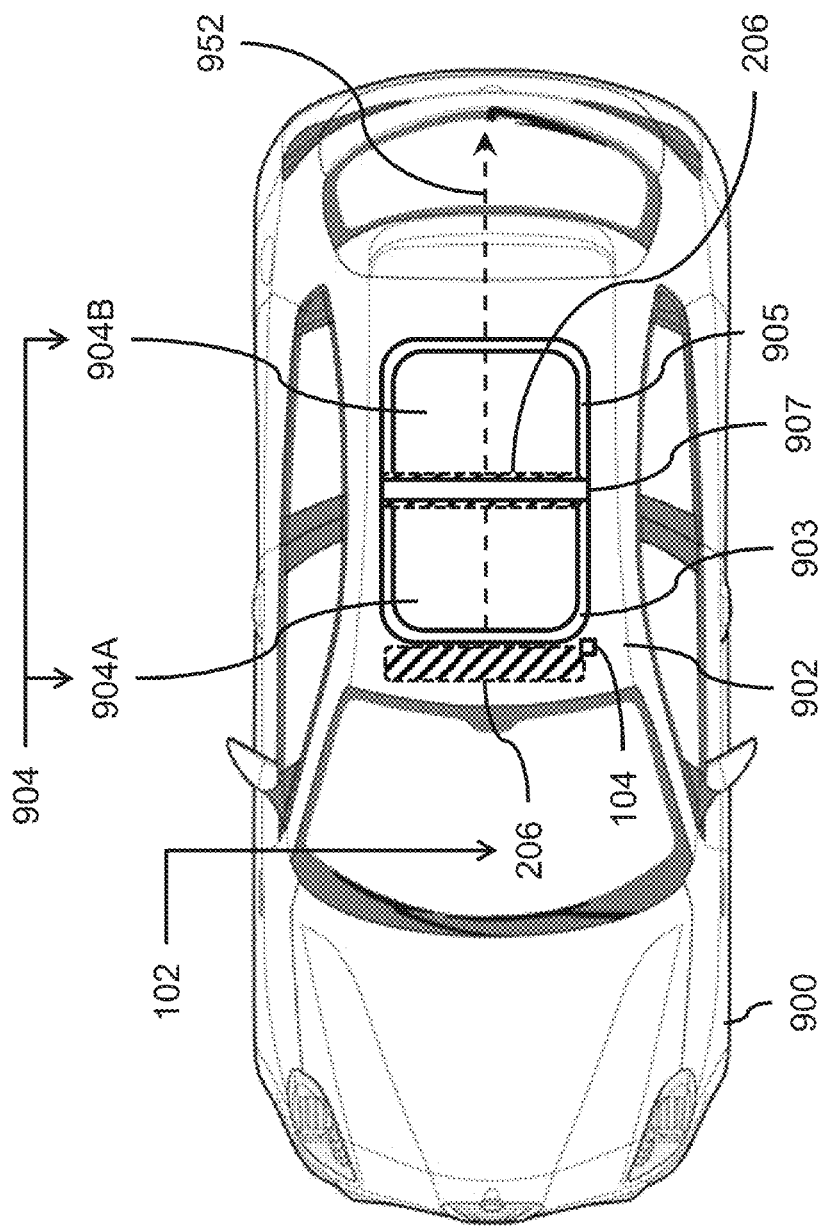

Referring to the embodiment of FIG. 3*e* (showing a top view), the module 102 further includes the air-moving device 206 positioned in front of the first panoramic roof panel 904A. If so desired, another instance of the air-moving device 206 is positioned in front of the second panoramic roof panel 904B. The air-moving device 206 is located or positioned in the interior of the vehicle 900; the air-moving device 206 is configured to blow air (forced air) along and past the first panoramic roof panel 904A and the second panoramic roof panel 904B from the front section of the vehicle 900 to the back section of the vehicle 900 (and parallel to the first panoramic roof panel 904A and the second panoramic roof panel 904B); in this manner, the air-moving device 206 is configured to provide heating (thermal management) to the first panoramic roof panel 904A and to the second panoramic roof panel 904B. It will be appreciated that additional instances of the air-moving device 206 may be required depending on the length and size of the panoramic roof panel 904 that is installed to the vehicle roof section 902 of the vehicle 900.

Figure 3F:
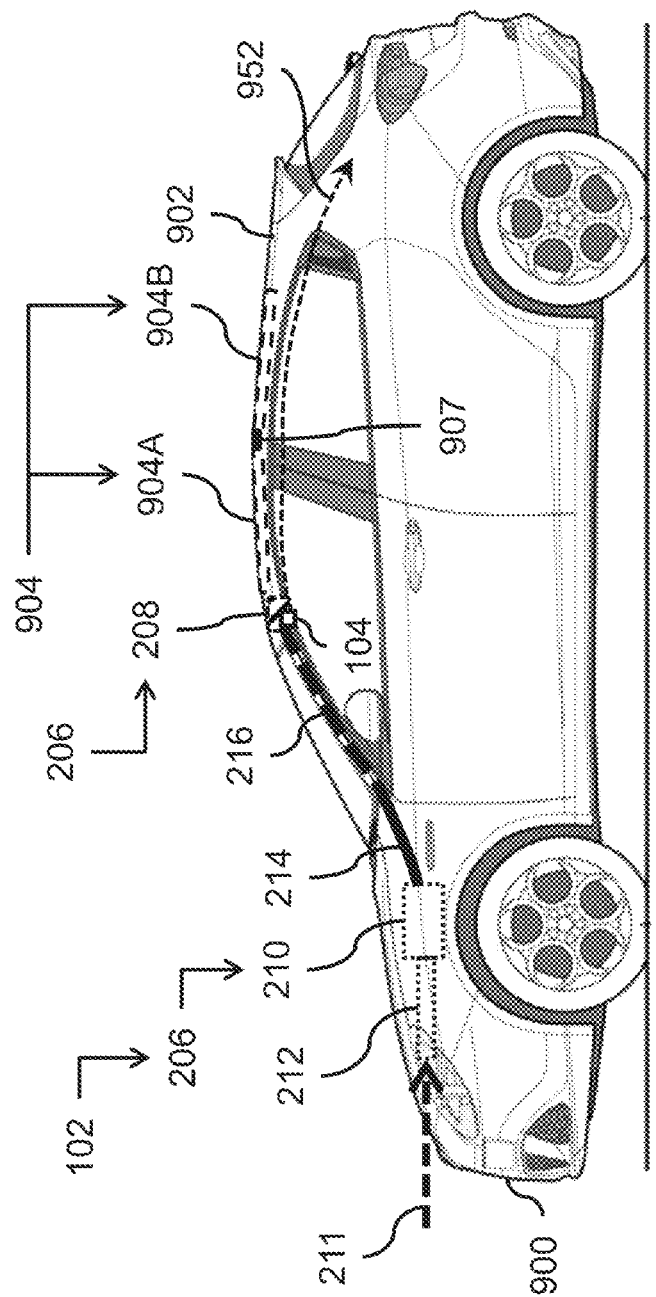
Figure 3G:
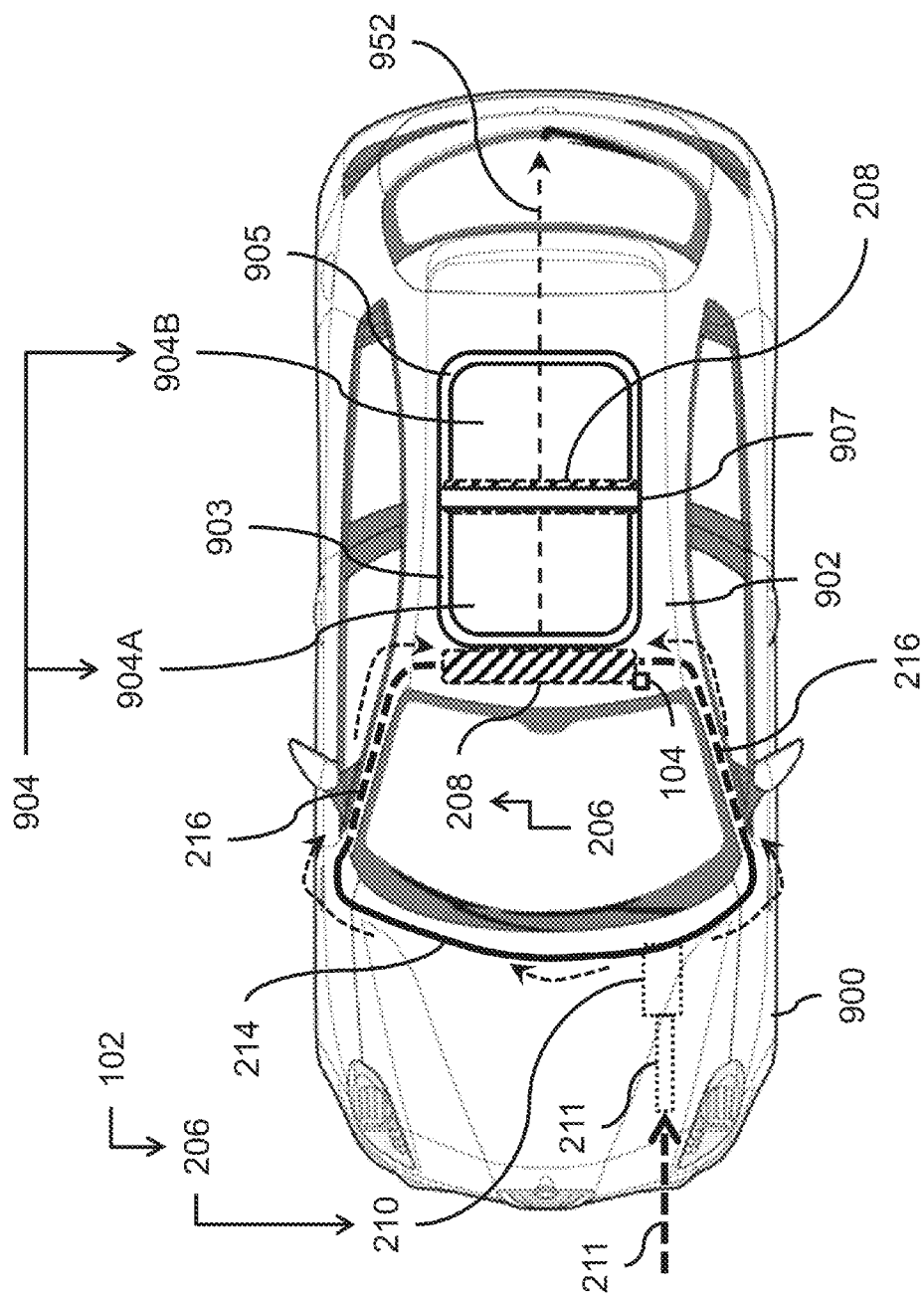

Referring to the embodiment of FIGS. 3*f* and 3*g* (showing a side view and a top view, respectively), the air-moving device 206 includes an air diffuser device 208 and an air generator 210 positioned in the engine compartment of the vehicle 900. A fresh air intake 212 is positioned in the engine compartment of the vehicle 900, and is operatively coupled to the air generator 210, and is configured to convey fresh air to the air generator 210 (from air arriving along an intake pathway 211 from the outside air). An air duct 214 extends from the air generator 210 through the interior of the vehicle 900 and toward the air diffuser device 208; preferably, the air duct 214 is hidden from view within the frame of the vehicle 900. The air diffuser device 208 is positioned proximate to the first panoramic roof panel 904A. The air duct 214 is fluidly connected to an air channel 216 that leads to the air diffuser device 208. For the case where the air generator 210 is deployed in the engine compartment of the vehicle 900, the air generator 210 is configured to blow forced air toward the first panoramic roof panel 904A by channeling the air from a front section to a back section of the vehicle 900 (parallel to the first panoramic roof panel 904A); in this manner, the air generator 210 is configured to provide a heating effect to (thermal management of) the panoramic roof panel 904; it will be appreciated that additional air channels, etc., may be required depending on the length and size of the first panoramic roof panel 904A. It will be appreciated that for the embodiment of FIG. 3*f*, the heating elements are connected to or embedded with the panoramic roof panel 904; the air generator 210 is configured to manage condensation formed on the panoramic roof panel 904 by feeding air from the engine compartment (with no additional heating to be provided by or from the engine and with no other heaters provided apart from the heaters already provided in or on the first panoramic roof panel 904A). The air generator 210 may include a temperature controller, a sensor, and a fan controller. The fresh air intake 212 may include a filter unit. The air duct 214 is configured to deliver or convey air to the air channel 216. The air channel 216 may be positioned and aligned along the vehicle windshield and the roof support frame. The air diffuser device 208 may include a set of nozzles; the air diffuser device 208 is configured to even out the amount of air flow across the first panoramic roof panel 904A. It will be appreciated that the air diffuser device 208 may not be required (depending on the configuration efficiency of the air generator 210).

FIGS. 4*a* to 4*k* depict schematic views of exemplary embodiments of a first apparatus 100 and a second apparatus 101 each including a panoramic roof panel thermal management module 102.

In accordance with the exemplary embodiments of FIGS. 4*a* to 4*k*, it will be appreciated that the panoramic roof panel 904 includes the interior-facing surface 906 (shown in FIG. 1*b*) and the outer-facing surface 908 (also shown in FIG. 1*b*) spaced apart from the interior-facing surface 906.

In accordance with the embodiment of FIG. 4*a*, the first apparatus 100 (of FIG. 2) and/or the second apparatus 101 (of FIG. 2) is adapted such that the connection structure 104 is configured to attach the roof panel heater assembly 106 proximate to the panoramic roof panel 904 and within the vehicle 900; it will be appreciated that for this example, the connection structure 104 includes screws, bolts, clips, mechanical fasteners, and anything equivalent thereof.

In accordance with the embodiment of FIG. 4*a*, the first apparatus 100 (of FIG. 2) and/or the second apparatus 101 (of FIG. 2) is adapted such that the roof panel heater assembly 106 includes a combination of an air-moving module 300, a heat-source module 302, and an air-diffuser module 304. The air-moving module 300 may also be called an air-directing module. The air-moving module 300 is configured to move air toward the interior-facing surface 906 of the panoramic roof panel 904. The heat-source module 302 is positioned proximate to an output of the air-moving module 300; the heat-source module 302 is configured to: (A) receive the air that is moved by the air-moving module 300; (B) impart heat to the air that is received from the air-moving module 300; and (C) permit movement of the air that is heated toward the interior-facing surface 906 of the panoramic roof panel 904. The air-diffuser module 304 is positioned proximate to an output of the heat-source module 302. The air-diffuser module 304 is configured to diffuse the air received from the heat-source module 302 in such a way that the air is directed by the air-diffuser module 304 to the interior-facing surface 906 of the panoramic roof panel 904 in a diffuse manner.

In accordance with the exemplary embodiments of FIGS. 4*a* to 4*k*, the panoramic roof panel 904 includes the flat heating element 200 of FIG. 3*a* or 3*b*. In accordance with options of the exemplary embodiments of FIGS. 4*a* to 4*k*, the panoramic roof panel 904 does not include the flat heating element 200.

In accordance with the exemplary embodiments of FIGS. 4*a* to 4*k*, the panoramic roof panel 904 includes the first panoramic roof panel 904A (front section) and the second panoramic roof panel 904B (rear section). Of course, in accordance with other options of the exemplary embodiments of FIGS. 4a to 4k, the panoramic roof panel 904 may include any one of the first panoramic roof panel 904A (front section), the second panoramic roof panel 904B (rear section), or the combination of both the first panoramic roof panel 904A (front section) and the second panoramic roof panel 904B (rear section).

Referring to the embodiment of FIG. 4a (showing a cross-sectional side view), an air passageway 305 is defined through the air-moving module 300, the heat-source module 302 and the air-diffuser module 304, once these modules are aligned with each other and mounted to the vehicle frame 914 of the vehicle 900. The connection structure 104 is configured to connect the air-moving module 300, the heat-source module 302 and the air-diffuser module 304 to the vehicle frame 914 (either individually or as a group). An air intake 311 is provided as an input portal for the air-moving module 300; the air intake 311 is configured to provide air taken in from the interior of the vehicle 900. The air flows through the air-moving module 300, the heat-source module 302 and the air-diffuser module 304, along a pathway 313 in which the forced heated air flows (preferably as a sheet of flowing heated air) to a portal defined in the vehicle frame 914 (from which the air flows along an outflow path 315).

A retractable roof liner section 306 (configured to be movable) is depicted in a closed condition, and is operatively installed relative to the vehicle frame 914. The retractable roof liner section 306 may also be called a retractable liner section. The retractable roof liner section 306 includes a roof liner perimeter 308 also operatively installed to the vehicle frame 914. The roof liner perimeter 308 is fixedly attached to the vehicle frame 914 (either directly or indirectly). A retractable roof liner section 306 includes a latch 310 configured to operatively latch the retractable roof liner section 306 to the roof liner perimeter 308 (as depicted in FIG. 4a). It will be appreciated that the latch 310 is provided for manually operated instances of the retractable roof liner section 306, and that the latch 310 is excluded for automatically operated instances of the retractable roof liner section 306. An air gap 916 is defined between the panoramic roof panel 904 and the retractable roof liner section 306 once the retractable roof liner section 306 is operatively closed (as depicted in FIG. 4a). The pathway 313 is defined within the air gap 916. The retractable roof liner section 306 is configured to be retractable for manually operated instances of the retractable roof liner section 306 and the automated instances of the retractable roof liner section 306.

Referring to the embodiment of FIG. 4aa (showing a cross-sectional side view), the retractable roof liner section 306 is positioned in an open condition. As depicted in FIG. 4aa, there is no air flow from the air-diffuser module 304 and along the pathway 313. A pathway 317 defines the path in which the retractable roof liner section 306 moves between the open condition (depicted in FIG. 4aa) and the closed condition (depicted in FIG. 4a). For the case where the roof panel heater assembly 106 is turned on (operative or energized), there is a flow of air along the path 313 from the air-diffuser module 304 past the surface of the panoramic roof panel 904 and toward the rear of the vehicle 900.

In general terms, in accordance with the embodiments of FIGS. 4a and 4aa, the roof panel heater assembly 106 is configured to provide forced air generation (movement of air), a heating effect, and diffused air flow) to be applied to the panoramic roof panel 904 via the air gap 916. Specifically, the roof panel heater assembly 106 includes a combination of: (A) the air-moving module 300 (having for examples blowers or fans) configured to generate a forced air flow; (B) a heat-source module 302; and (C) an air-diffuser module 304 configured to direct or channel treated air (such as heated air) toward the panoramic roof panel 904, whether the retractable roof liner section 306 is provided (as depicted in FIGS. 4a, 4aa and 4b) or whether the retractable roof liner section 306 is not provided (as depicted in FIG. 4c).

It will be appreciated that the embodiment of FIG. 3a or 3b may be combined with (or is not combined with) the embodiment of FIG. 4a. The embodiment of FIG. 4a may be configured to provide a forced air flow that provides a heating effect to the panoramic roof panel 904 to soften and/or melt the ice and/or snow placed on the panoramic roof panel 904.

Figure 4B:
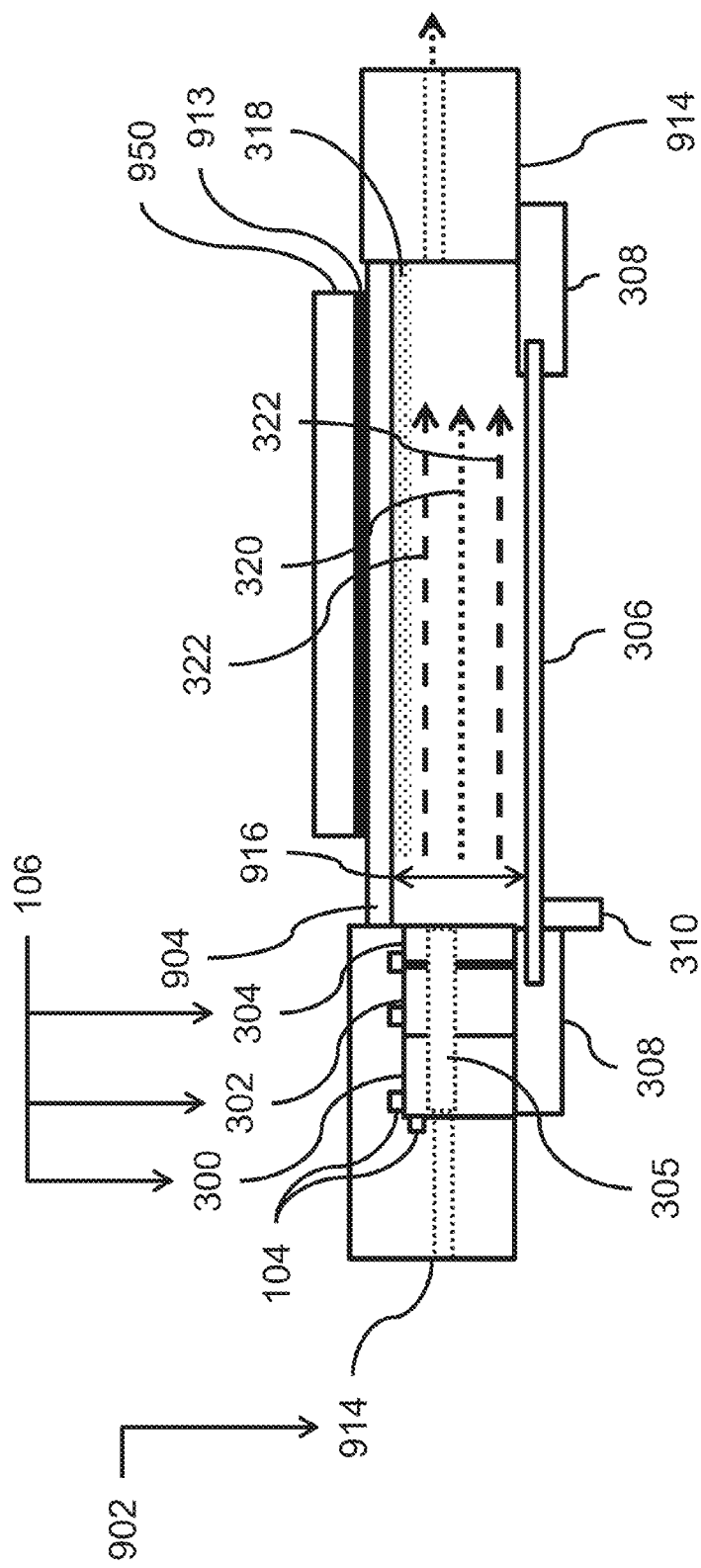
Figure 4C:
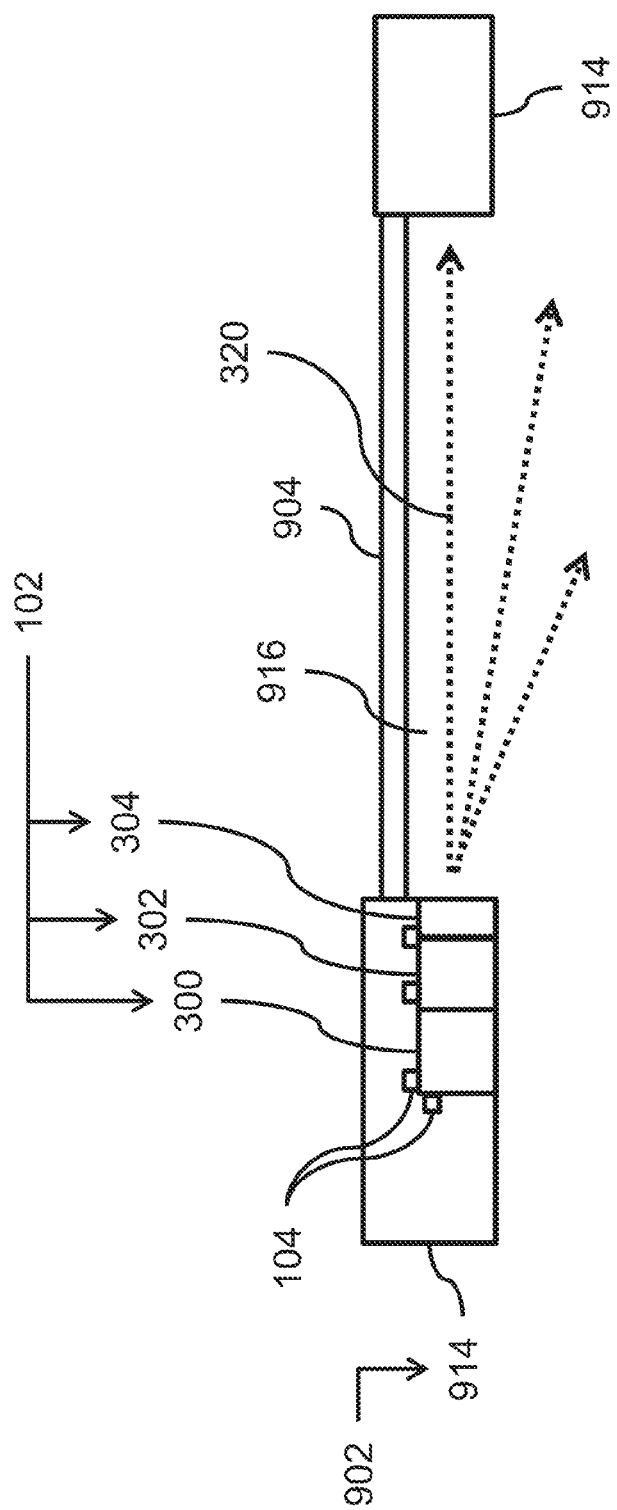

Referring to the embodiment of FIG. 4b (showing a cross-sectional side view), to improve efficiency, the air gap 916 (also called an air space) may be as narrow as possible in order for heated air to flow through the air gap 916. The air gap 916 is formed between the bottom surface of the panoramic roof panel 904 and the top surface of the retractable roof liner section 306 (for the case where the retractable roof liner section 306 is placed in the closed condition as depicted in FIG. 4b).

A virtual boundary layer 318 is a layer in which the heating effect is applied to the bottom surface (also called the interior-facing surface 906) of the panoramic roof panel 904; it is preferred to maximize the amount of heating effect transferred to the panoramic roof panel 904 (without causing damage to the panoramic roof panel 904). A boundary layer 913 is set up in a bottom section of the panoramic roof panel 904 and is located between the ice and snow resting on the top surface of the panoramic roof panel 904 and the virtual boundary layer 318. A relatively faster air speed zone 320 is set up in the central zone of the air gap 916 (once air is forced to flow along through the air gap 916 and across the bottom surface of the panoramic roof panel 904). In the relatively faster air speed zone 320, a relatively faster air speed is set up in the central section of the air gap 916 (since there is no obstruction to the flow of air in the relatively faster air speed zone 320). A relatively slower air speed zone 322 is set up between: (A) the lower surface of the panoramic roof panel 904 and the relatively faster air speed zone 320, and (B) the top of the retractable roof liner section 306 and the relatively faster air speed zone 320. The relatively lower air speed in the relatively slower air speed zone 322 is due to the drag caused by the lower surface of the panoramic roof panel 904 and by the top surface of the retractable roof liner section 306. It will be appreciated that within the air gap 916, relatively hotter air may rise (unobstructed) toward the bottom surface of the panoramic roof panel 904.

Between the panoramic roof panel 904 and the retractable roof liner section 306 and within the air gap 916, there are two general air flow zones (regions): the relatively faster air speed zone 320 and the relatively slower air speed zone 322 that are set up or caused by boundary layer and/or drag of the surface of the panoramic roof panel 904 and the surface of the retractable roof liner section 306. The virtual boundary layer 318 is an area closest to the bottom or lower surface of the panoramic roof panel 904 (inside the vehicle 900), and is the zone in which the heating effect is applied to the panoramic roof panel 904. The air gap 916 may need to receive as much heated forced air (that is, air forced to move) as possible in order to soften and/or melt the ice and/or snow positioned relative to the boundary layer 913. To achieve this, there may be a balance between the amount of heated air flow applied to the air gap 916 versus the size of air gap 916 (thermodynamic considerations). For instance, for the case where a smaller amount of the air gap 916 is used at the same air volume capacity to be delivered, a faster the air flow through the air gap 916 may be required. A relatively smaller instance of the air gap 916 may cause more drag and back pressure experience in the air gap 916 that causes a reduction in air flow through the air gap 916. Therefore, it may be necessary to generate a relatively higher air speed in the air gap 916 under this scenario.

An advantage of the embodiment of FIG. 4b is that hot air rises toward the bottom surface of the panoramic roof panel 904, and therefore (in terms of location of the placement of the panoramic roof panel 904), this embodiment may be optimized; it will be appreciated that this effect (rising hotter air) may be diminished when faster air flow through the air gap 916 is used.

Of course it will be appreciated that the embodiment of FIG. 4b may have better performance for the case where the retractable roof liner section 306 is placed in the closed position (as depicted in FIG. 4b) versus the case where the retractable roof liner section 306 is placed in the open condition (depicted in FIG. 4aa).

Referring to the embodiment of FIG. 4c (showing a cross-sectional side view), the retractable roof liner section 306 of FIG. 4b is not used (for this case), and it will be appreciated that the heating effect may still be applied to the panoramic roof panel 904 (nevertheless) since some degree of the heating effect may still be imparted to the panoramic roof panel 904 (but perhaps not as efficiently as the embodiment depicted in FIG. 4b). The air flow from the air-diffuser module 304 may be directed to the bottom surface of the panoramic roof panel 904 along a relatively faster air speed zone 320 that permits a relatively unfocused flow of heated air toward the panoramic roof panel 904.

Figure 4D:
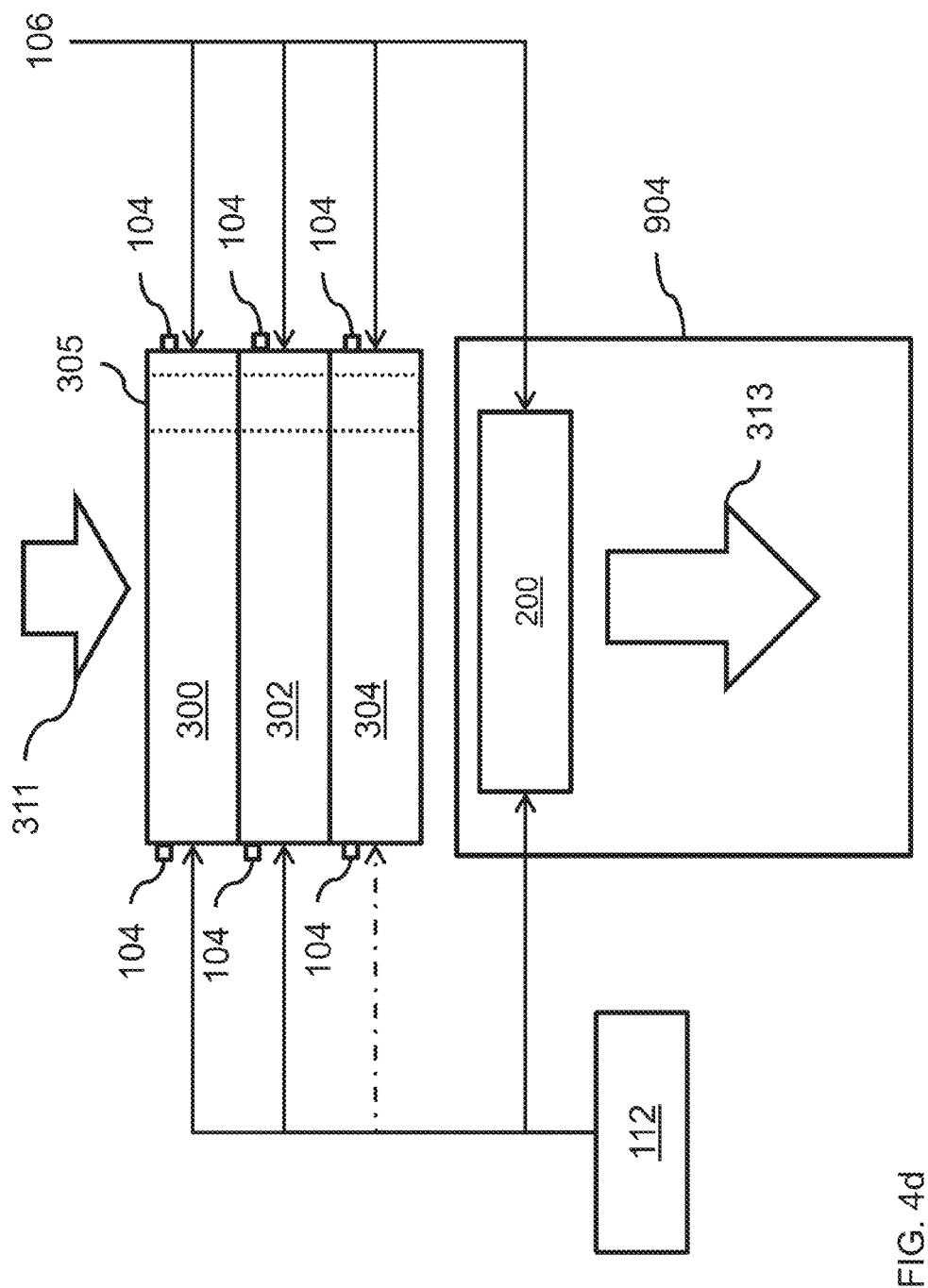
Figure 4E:
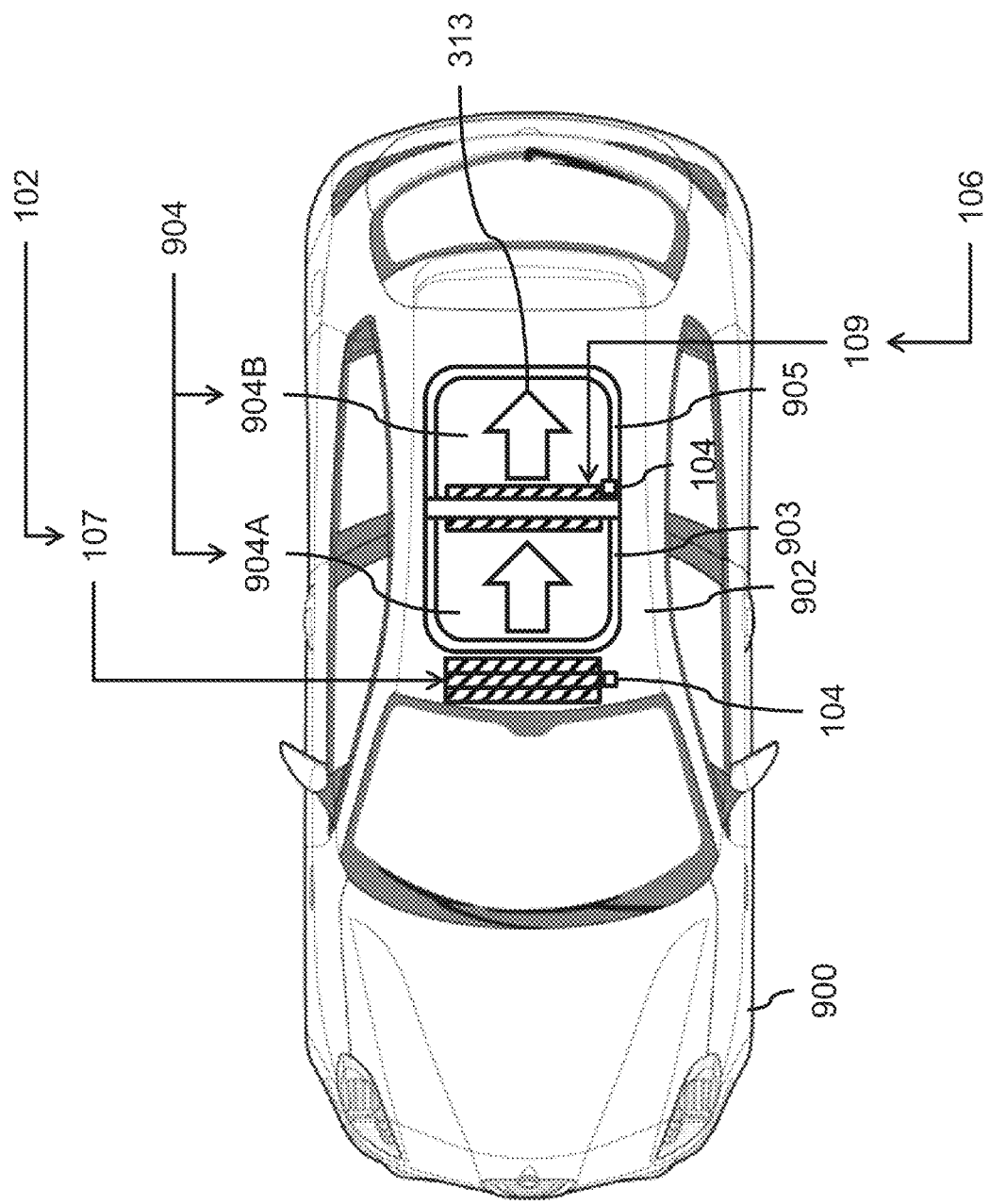

Referring to the embodiment of FIG. 4d (showing a schematic view), it will be appreciated that the embodiments of FIGS. 3a to 3g (in any combination and/or permutation thereof) may be combined with the embodiments of FIGS. 4a to 4k (in any combination and/or permutation thereof). The air-moving module 300 may be mounted proximate to the top of the front windshield of the vehicle 900 (as depicted in FIG. 4e). The air-moving module 300 may include, for instance, a fan unit or a blower unit. It will be appreciated that the generation of forced air may be provided by other sources that are positioned elsewhere in the vehicle 900 (other than or in conjunction with the air-moving module 300).

In accordance with the embodiments of FIGS. 4e (top view), 4h (side view), 4i (side view), 4j (top view) and 4k (top view), the roof panel heater assembly 106 includes a first roof panel temperature control module 107 and a second roof panel temperature control module 109. The first roof panel temperature control module 107 is positioned proximate to the first panoramic roof panel 904A. The second roof panel temperature control module 109 is positioned proximate to the second panoramic roof panel 904B (and may or may not be necessary, depending on the specification requirements of the vehicle 900). The roof panel heater assembly 106 includes a first roof panel temperature control module 107 and a second roof panel temperature control module 109. The first roof panel temperature control module 107 is positioned proximate to the first panoramic roof panel 904A. The second roof panel temperature control module 109 is positioned proximate to the second panoramic roof panel 904B (and may or may not be necessary).

Figure 4F:
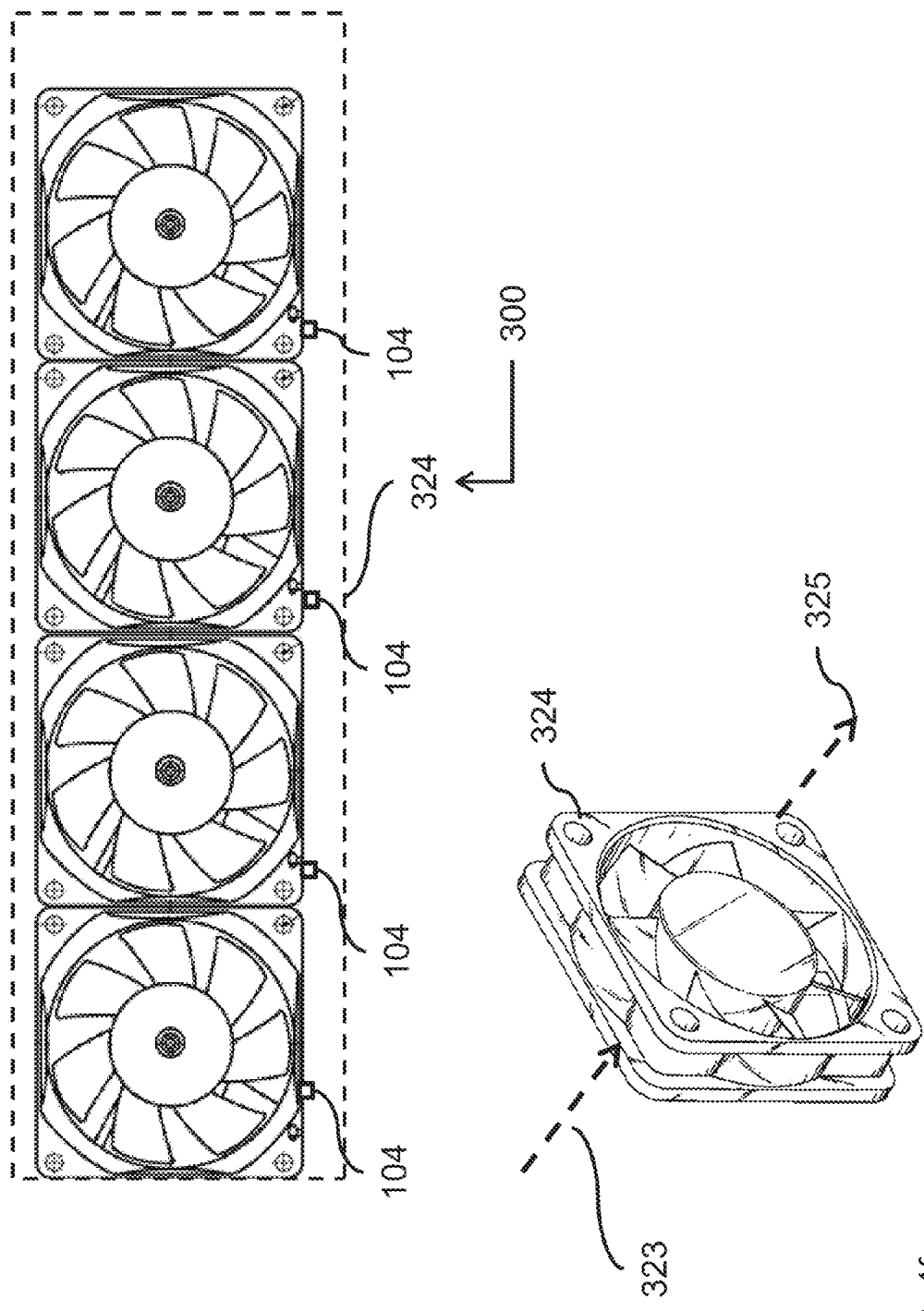

Referring to the embodiment of FIG. 4f (showing side and perspective views), the air-moving module 300 includes a grouping of fan units 324 (also called a bank of fans); four instances of a fan unit are depicted; however, the air-moving module 300 is not limited to four instances of the fan unit. The grouping of fan units 324 is configured to generate forced air movement through the air passageway 305 (depicted in FIG. 4d) that extends through the air-moving module 300, the heat-source module 302 and the air-diffuser module 304. It is preferred to use electrically operable fan units, or ultra-efficient and/or relatively higher speed fans, such as electric jet engine fans, smaller electro-static fans, and/or other ultra-high speed and/or higher speed fans. It will be appreciated that there may be a balance or a trade-off between a noisy fan unit with relatively higher noise output having relatively higher air movement capability, power and/or space limitations of the vehicle 900. Multiple instances of the fan units may be used to improve the spread of the heated air evenly across the bottom surface of the panoramic roof panel 904 from the interior of the vehicle 900. The grouping of fan units 324 includes or provides an inflow path 323 and an outflow path 325.

Figure 4G:
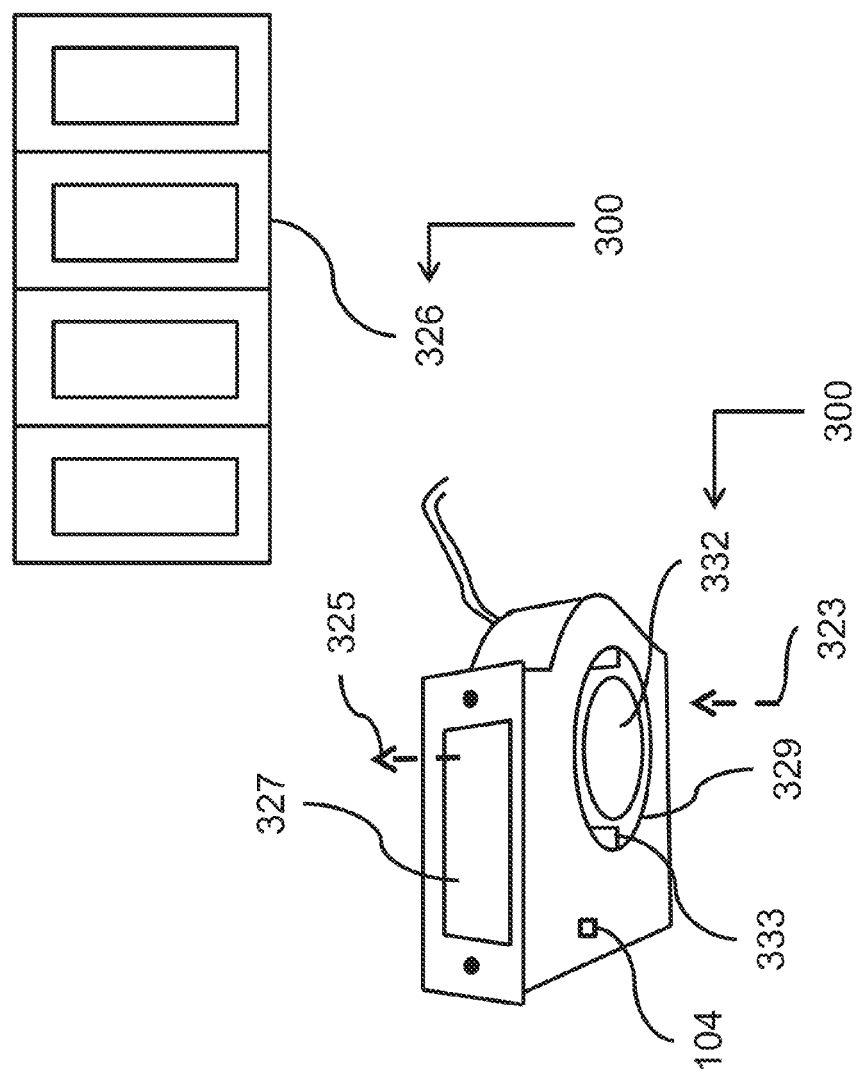
Figures 1, 4G:
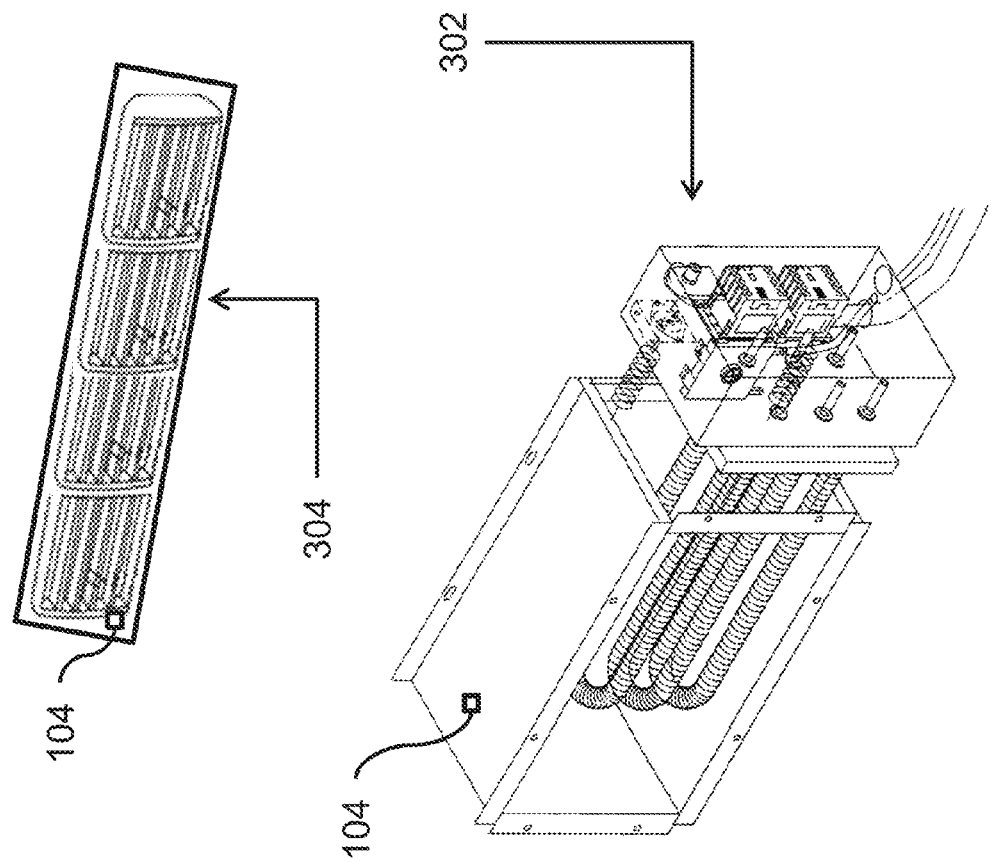
Figures 2, 4G:
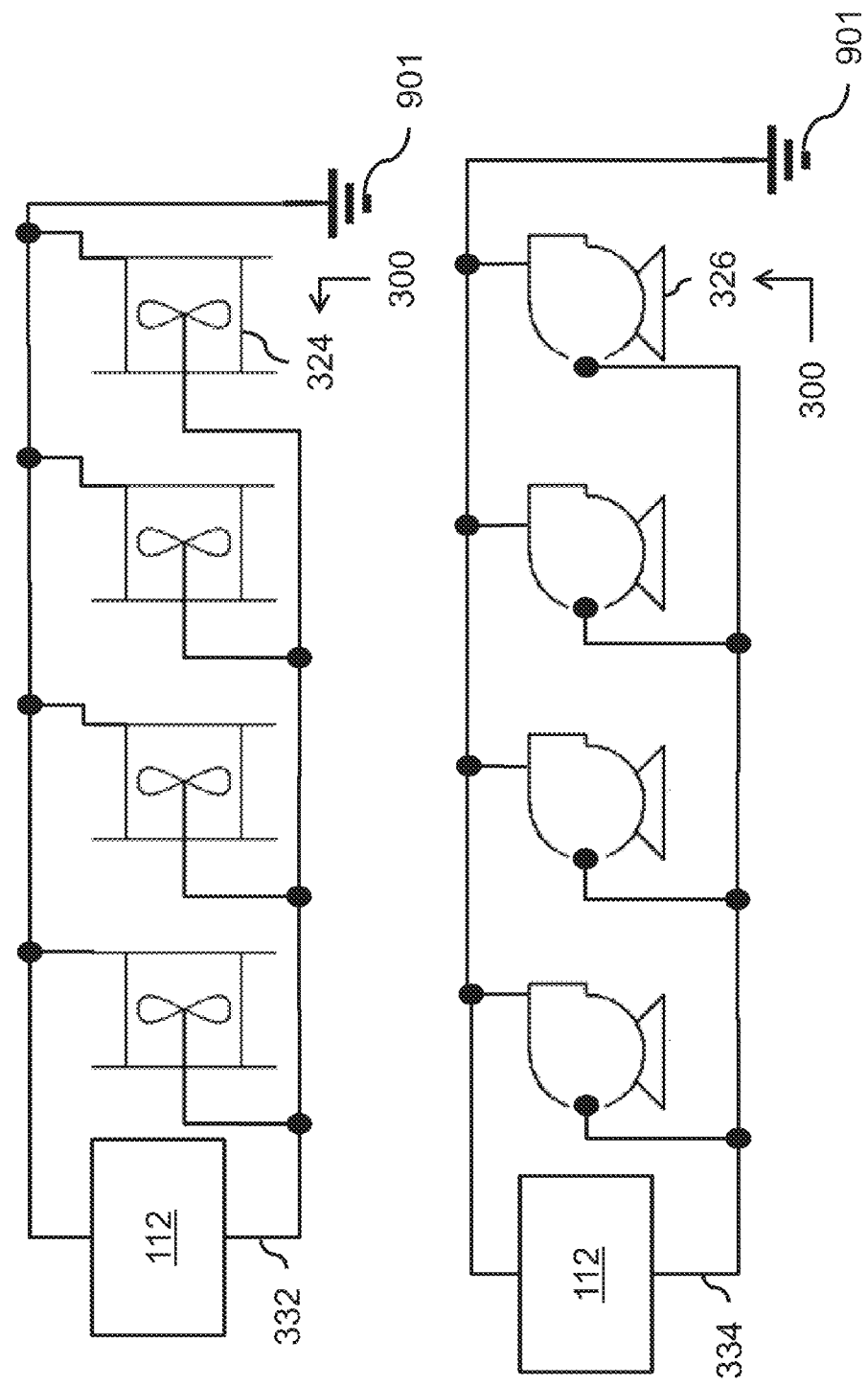
Figures 3, 4G:
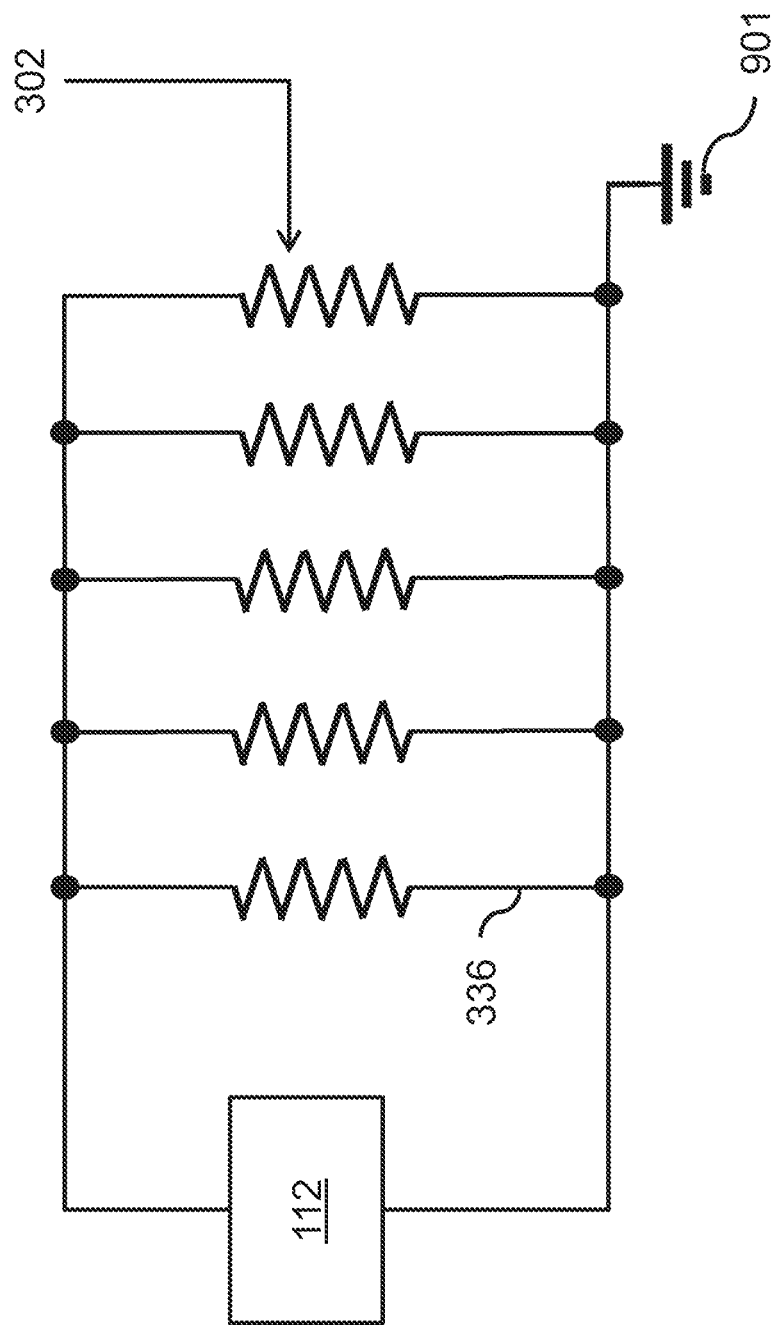

Referring to the embodiment of FIG. 4g (showing side and perspective views), the air-moving module 300 includes a grouping of blower units 326 (also called a bank of blowers or at least one blower unit); four instances of a blower unit are depicted. Each blower unit includes: a blower outlet 327 and a blower inlet 329 that is spaced apart from the blower outlet 327. A blower motor 331 is mounted between the blower outlet 327 and the blower inlet 329. Blower blades 333 are operatively mounted to the blower motor 331. The grouping of blower units 326 is configured to generate a flow of forced air from relatively higher speed blowers that are located near the top of the front windshield of the vehicle 900 (as depicted in FIG. 4h, for instance). The grouping of blower units 326 may include electric blowers, relatively higher efficient electric blowers, ultra high speed and/or high air volume blowers. It will be appreciated that each blower unit has its own electric motor, and each blower may have its own air inlet and air outlet, or alternatively may have a common air inlet and a common air outlet (if so desired). The blower unit may be rotatably mounted and rotatably movable so that the blower unit may have a relatively lower profile so that in this manner, the blower units may be positioned inline relative to each other (if so desired). It will be appreciated that there may be a trade-off or a balance between noise provided by the blower units, the amount of air to be moved, and power and/or space limitations associated with the vehicle 900. It will be appreciated that instances of the blower units may be used or deployed to improve the spread of the heated air evenly across the panoramic roof panel 904 from side to side of the vehicle 900.

Referring to the embodiment of FIG. 4g-1 (showing perspective views), the heat-source module 302 includes a collection of heating elements positioned within a housing unit. Also shown is the air-diffuser module 304 including a collection of air diffusion devices housed in a housing unit.

Referring to the embodiment of FIG. 4g-2 (showing schematic views), the grouping of fan units 324 includes an electrical circuit 332 configured to connect electrical power to the grouping of fan units 324 (for the case where the grouping of fan units 324 is used). As well, for the case where the blower units 326 are used, the blower units 326 includes an electric circuit 334 configured to connect electric power to the blower units 326.

Referring to the embodiment of FIG. 4g-2 (showing a schematic view), the heat-source module 302 includes an electric circuit 336 configured to connect the heating elements of the heat-source module 302 in order to provide electric power to the heating elements.

Figures 4, 4G:
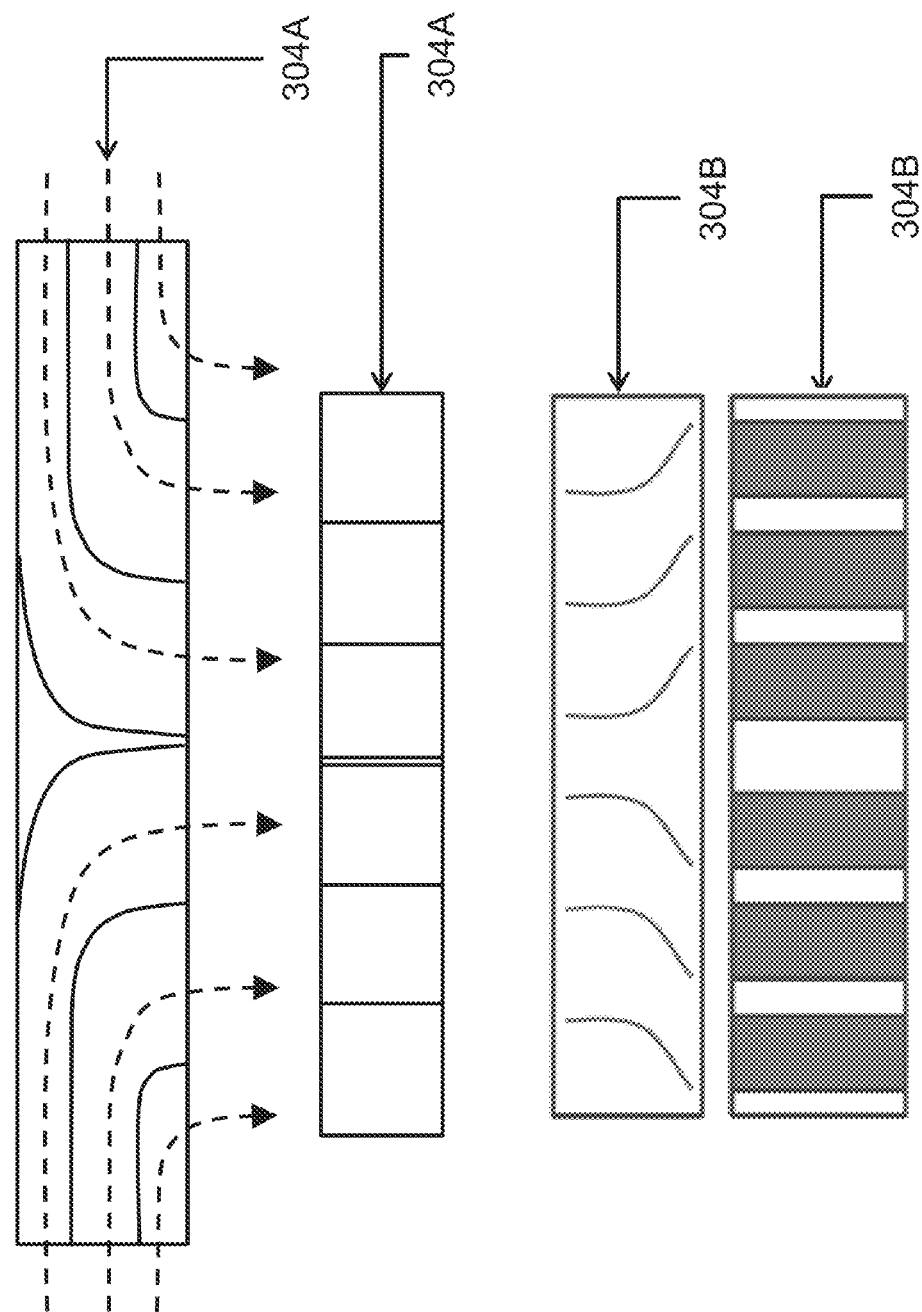
Figure 4H:
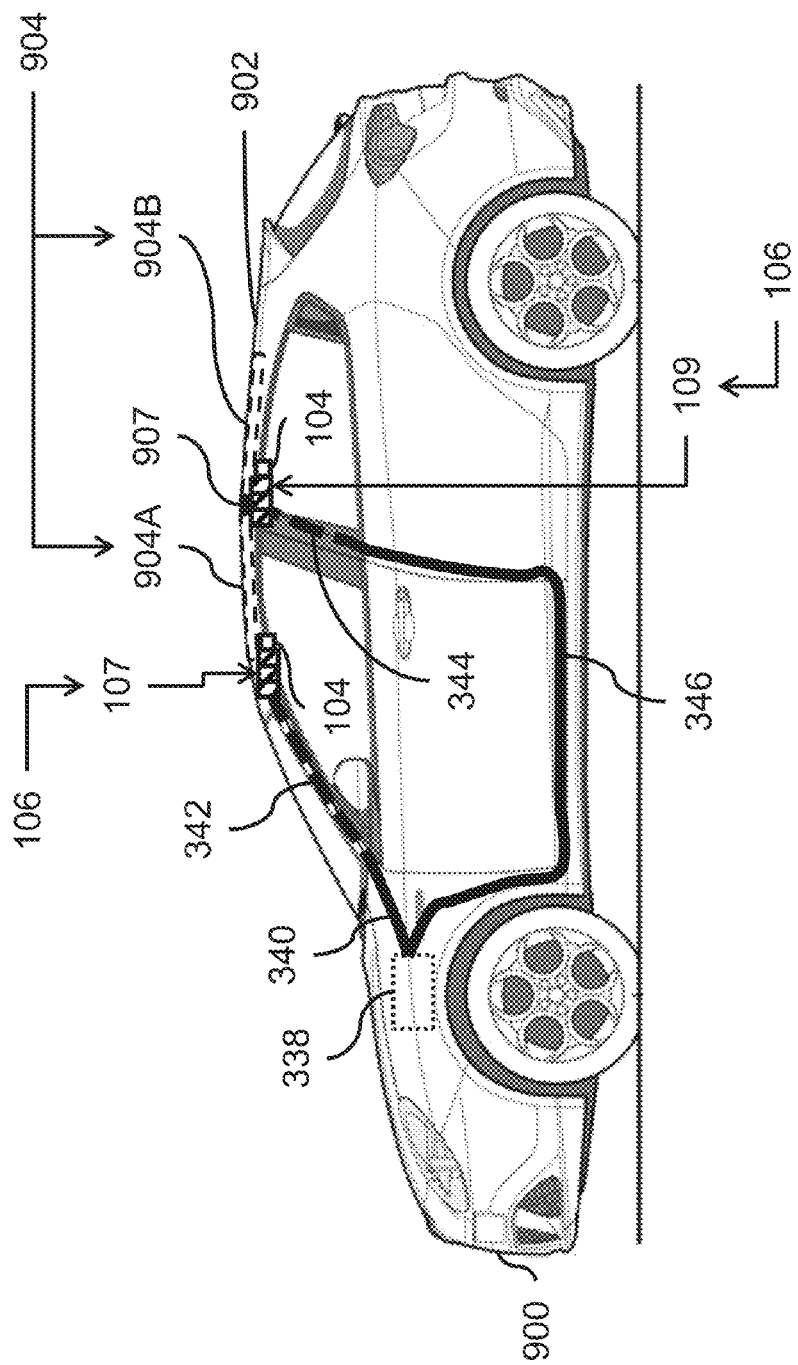

Referring to the embodiment of FIG. 4g-4 (showing a top view and a side view) the air-diffuser module 304 is depicted. There are two examples depicted of the air-diffuser module 304: an air-diffuser module 304A and an air-diffuser module 304B. A top view is shown of the air-diffuser module 304A at the top section of FIG. 4g-4 (the air flow is indicated in dotted arrow lines), and a front view is shown of the air-diffuser module 304A positioned below the top view of the air-diffuser module 304A. A top view is shown of the air-diffuser module 304B at the bottom section of FIG. 4g-4, and a front view is shown of the air-diffuser module 304B positioned above the top view of the air-diffuser module 304B.

Figure 4I:
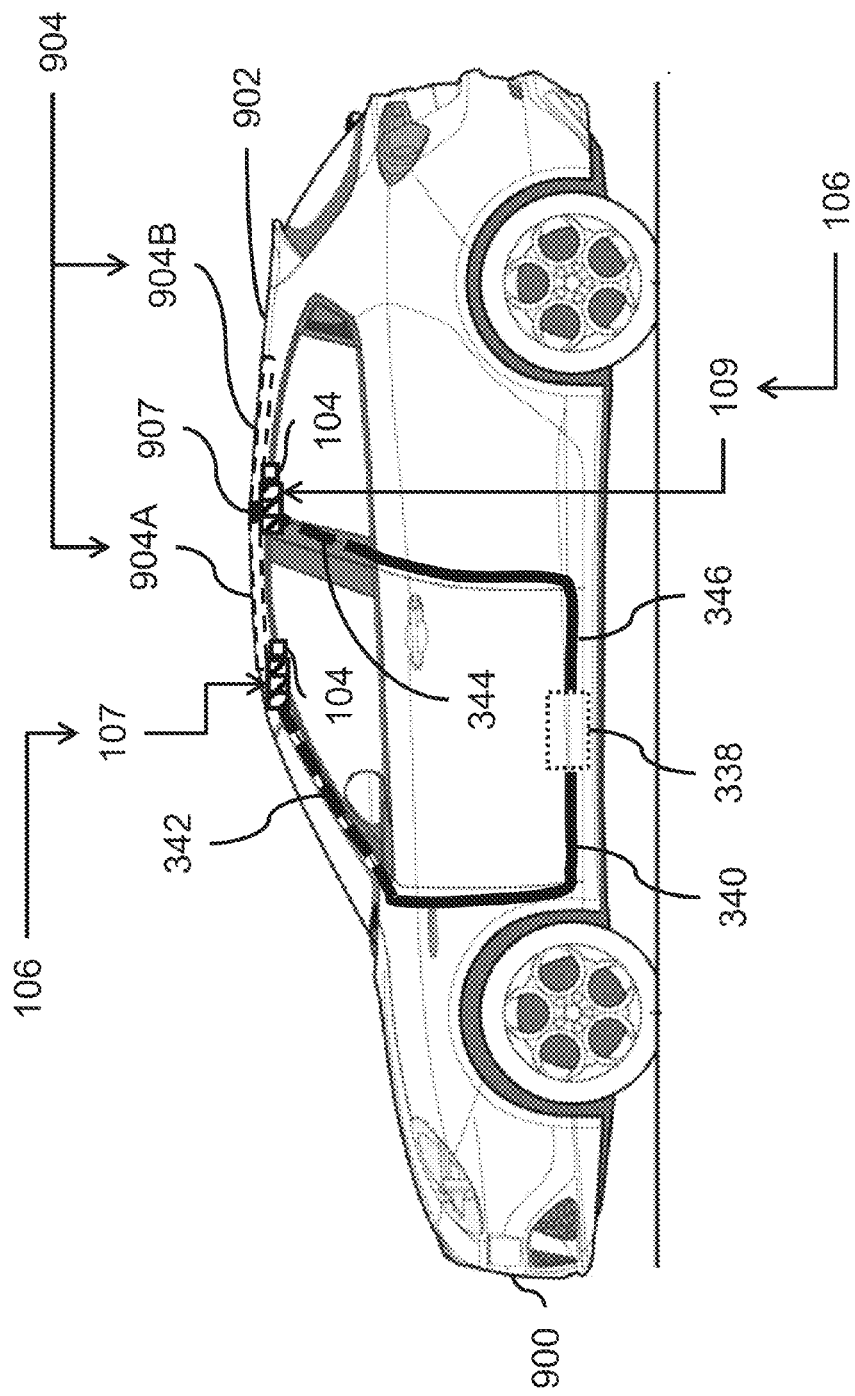

Referring to the embodiments of FIGS. 4h and 4i (showing side views), the roof panel heater assembly 106 further includes a forced air generator 338, a front air duct 340, a front air channel 342, a rear air channel 344, and a rear air duct 346. Generation of forced air may be provided by the forced air generator 338 positioned in the engine compartment (as depicted in FIG. 4h) or positioned in the interior (such as, in the passenger compartment) of the vehicle 900 (as depicted in FIG. 4i). Placement of the forced air generator 338 in the engine compartment and/or in the interior of the vehicle 900 may depend on engine compartment requirements or passenger compartment requirements. The forced air generator 338 is configured to generate forced movement of air through the front air duct 340 and the rear air duct 346 that are each operatively connected to the forced air generator 338. The front air channel 342 and the rear air channel 344 are operatively connected to the front air duct 340 and the rear air duct 346 (respectively) in such a way as to receive the forced movement of air from the front air duct 340. The front air duct 340 is configured to convey forced air to the roof panel heater assembly 106. In this manner, movement of forced air may be conveyed to the roof panel heater assembly 106 having the air-moving module 300, the heat-source module 302 and the air-diffuser module 304 (depicted in FIG. 4d), which in turn may be conveyed to the first panoramic roof panel 904A and the second panoramic roof panel 904B. The front air duct 340 and the rear air duct 346 may be positioned on the left side and the right side of the vehicle 900. Of course, it is understood that depending on heating of the first panoramic roof panel 904A and second panoramic roof panel 904B, the rear air duct 346 and the rear air channel 344 may not be required. It will be appreciated that the air-moving module 300 of the first roof panel temperature control module 107 is provided with assistance, with forced air movement to be provided by the forced air generator 338. The forced air generator 338 may be positioned where required in order to take into account the overall requirements of the vehicle 900. In accordance with the embodiment of FIG. 4h, the roof panel heater assembly 106 includes the heat-source module 302 (depicted in FIG. 4d) in order to generate heat (and to manage the thermal requirements of the first panoramic roof panel 904A or the second panoramic roof panel 904B), especially so if the first panoramic roof panel 904A or the second panoramic roof panel 904B do not include the flat heating element 200 of FIG. 3a or 3b. The forced air generator 338 may be used or deployed to provide a sufficiently high enough air speed and movement of air volume to take into account the power and space limitations of the vehicle 900.

Figure 4J:
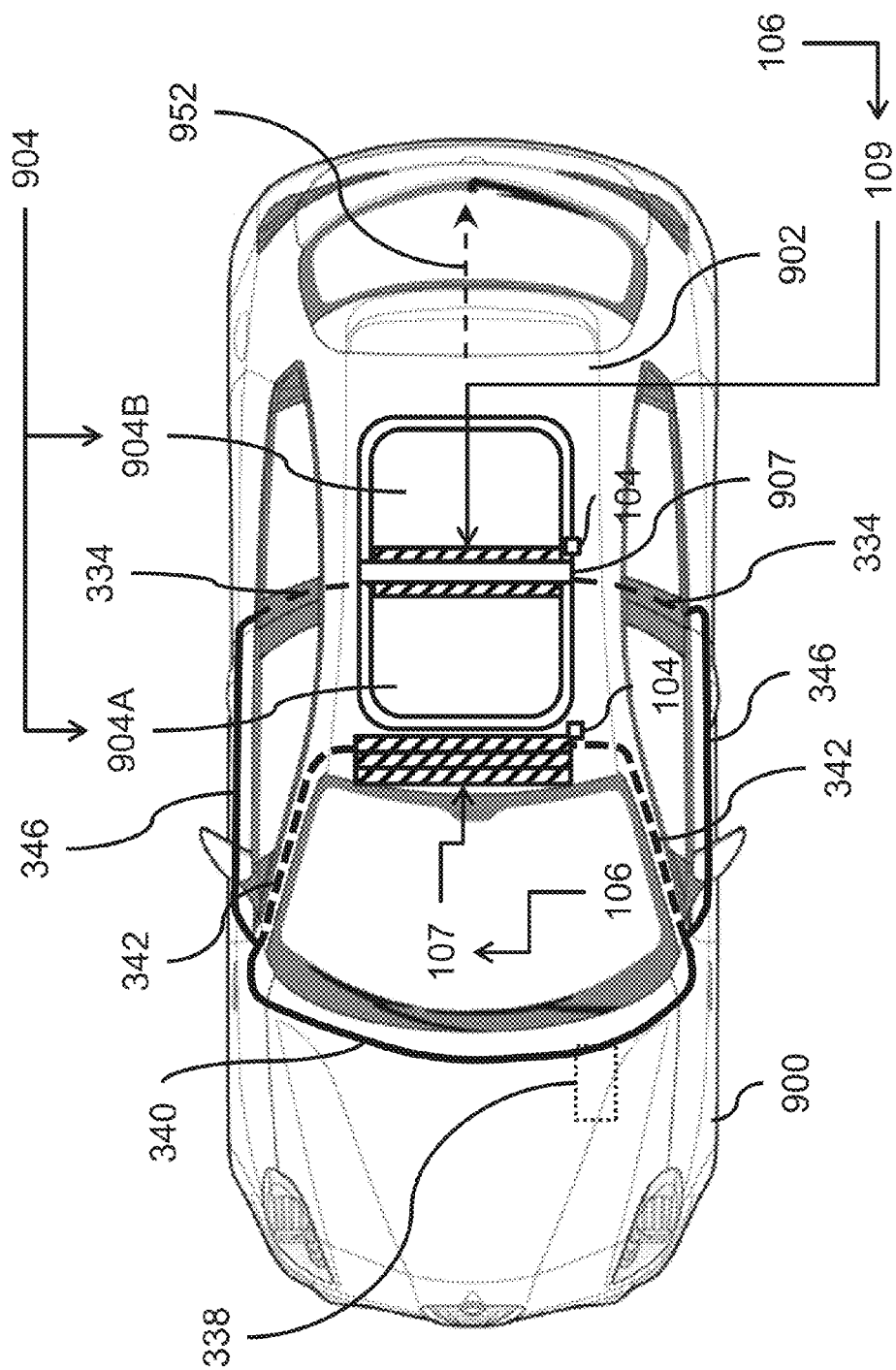
Figure 4K:
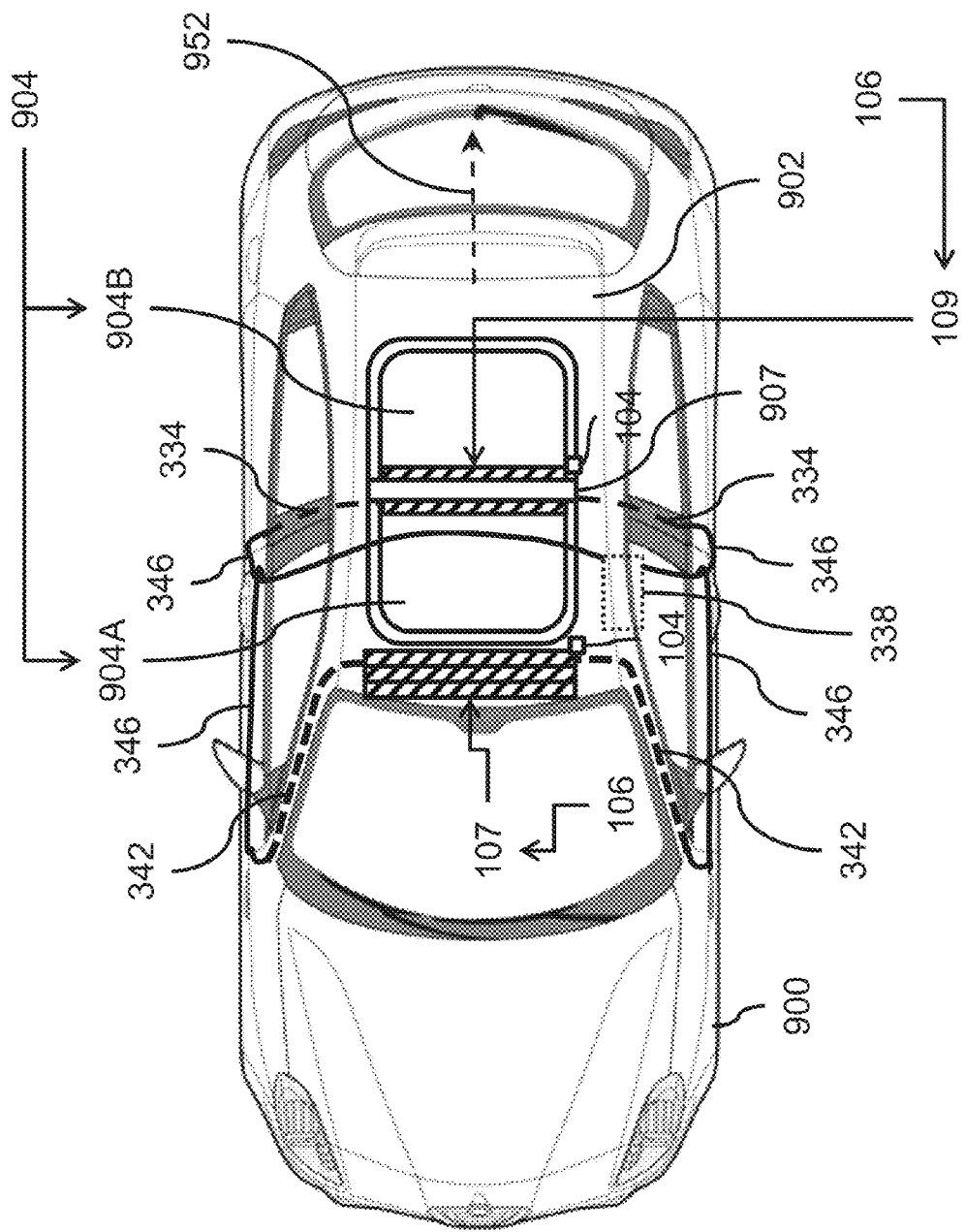

Referring to the embodiments of FIGS. 4j and 4k, the top views of the embodiments of FIGS. 4h and 4i (respectively) are depicted. It will be appreciated that the second roof panel temperature control module 109 is positioned proximate to the second panoramic roof panel 904B; the second roof panel temperature control module 109 may not be necessary; it will be appreciated that the middle module of the second roof panel temperature control module 109 is hidden in this view because of the divider structure 907.

FIG. 5 depicts a side view of a first apparatus 100 and a second apparatus 101 each including a panoramic roof panel thermal management module 102.

In accordance with the embodiment of FIG. 5, it will be appreciated that the panoramic roof panel 904 includes the interior-facing surface 906 (also shown in FIG. 1b) and the outer-facing surface 908 (shown in FIG. 1b) spaced apart from the interior-facing surface 906.

In accordance with the embodiment of FIG. 5, the roof panel heater assembly 106 includes a first roof panel temperature control module 107 and a second roof panel temperature control module 109. The first roof panel temperature control module 107 is positioned proximate to the first panoramic roof panel 904A. The second roof panel temperature control module 109 is positioned proximate to the second panoramic roof panel 904B (and may or may not be necessary, depending on the specification requirements of the vehicle 900).

In accordance with the embodiment of FIG. 5, the first apparatus 100 (of FIG. 2) and/or the second apparatus 101 (of FIG. 2) is adapted such that the connection structure 104 is configured to attach the roof panel heater assembly 106 proximate to the panoramic roof panel 904 and within the vehicle 900.

In accordance with the embodiment of FIG. 5, the first apparatus 100 (of FIG. 2) and/or the second apparatus 101 (of FIG. 2) is adapted such that the roof panel heater assembly 106 includes a combination of a first stage 400, a conduit structure 402, and a second stage 404. The first stage 400 includes a pre-heating device 410 mounted proximate to an engine block 912 of the vehicle 900. The conduit structure 402 is configured to fluidly communicate the first stage 400 with the second stage 404.

The pre-heating device 410 includes a heater and an air mover (generator), along with temperature, sensors and fan and heater valve controls, etc. A fresh air intake 412 is configured to convey fresh air from the external environment to the pre-heating device 410, and may include a filter (if so desired). A pathway 414 leads in from the exterior of the vehicle 900 to the fresh air intake 412, and it is the direction taken by fresh air to enter the pre-heating device 410. The pre-heating device 410 is configured to heat up the air received from the fresh air intake 412, and to output the heated air. An air duct 416 is in fluid communication with the pre-heating device 410, and is configured to receive the heater air from the pre-heating device 410. The air duct 416 is positioned within the vehicle 900 out of view. An air channel 418 is in fluid communication with the air duct 416, and is configured to convey the heated air from the air duct 416 toward the first panoramic roof panel 904A (specifically to the first roof panel temperature control module 107).

In accordance with the embodiment of FIG. 5, the first apparatus 100 (of FIG. 2) and/or the second apparatus 101 (of FIG. 2) is adapted such that the second stage 404 includes a combination of an air-moving module 300, a heat-source module 302, and an air-diffuser module 304 (similar to the embodiment of FIG. 4a). The air-moving module 300 is configured to move air toward the interior-facing surface 906 of the panoramic roof panel 904. The heat-source module 302 is positioned proximate to an output of the air-moving module 300; the heat-source module 302 is configured to: (A) receive the air that is moved by the air-moving module 300; (B) impart heat to the air that is received from the air-moving module 300; and (C) permit movement of the air that is heated toward the interior-facing surface 906 of the panoramic roof panel 904. The air-diffuser module 304 is positioned proximate to an output of the heat-source module 302; the air-diffuser module 304 is configured to diffuse the air received from the heat-source module 302 in such a way that the air is directed by the air-diffuser module 304 to the interior-facing surface 906 of the panoramic roof panel 904 in a diffuse manner.

In accordance with the embodiment of FIG. 5, the panoramic roof panel 904 includes the flat heating element 200 of FIG. 3*a* or FIG. 3*b* (if so desired). In accordance with an option of the embodiment of FIG. 5, the panoramic roof panel 904 does not include the flat heating element 200.

In accordance with the embodiment of FIG. 5, the panoramic roof panel 904 includes the first panoramic roof panel 904A (front section) and the second panoramic roof panel 904B (rear section). Of course, in accordance with another option of the embodiment of FIG. 5, the panoramic roof panel 904 may include any one of the first panoramic roof panel 904A (front section), the second panoramic roof panel 904B (rear section), or the combination of both the first panoramic roof panel 904A (front section) and the second panoramic roof panel 904B (rear section).

In accordance with an embodiment, the pre-heating device 410 includes a fluid inlet 420, a fluid outlet 422, an air inlet 424, and an air outlet 426. The fluid inlet 420 is configured to receive a heated liquid (medium) from the engine block 912 of the vehicle 900. The fluid outlet 422 is configured to provide a relatively cooler liquid back to the engine block 912 of the vehicle 900. The air inlet 424 is configured to receive fresh air (from the fresh air intake 412). The air outlet 426 is configured to provide heated air to the air duct 416.

It will be appreciated that the embodiment depicted in FIG. 5, the pre-heating device 410 is configured to preheat air from within the engine compartment of the vehicle 900, and is also configured to provide forced movement of the heated air (that is, in the first stage 400) toward the panoramic roof panel 904 via the air duct 416 and the air channel 418.

It will be appreciated that there may be an advantage for the combination of the embodiment of FIGS. 3*a* and 3*b* with the embodiment of FIG. 5.

Referring to the embodiment of FIG. 5, there is provided the feeding of heated air from the engine compartment of the vehicle 900 (via the first stage 400 called preheating), along with the addition of a second stage 404 that includes at least one or more of the technical features of the embodiments of FIGS. 4*a* to 4*k*.

An advantage of the embodiment of FIG. 5 is the improved efficiency of the heating effect applied to the panoramic roof panel 904, taking into account the heat contributed from the engine block area of the vehicle 900; this is the first stage 400 configured to provide heat (since the combustion engine generates heat as a by-product) to the air, and then force movement of the air via conduit structure 402 over to a second stage 404. The second stage 404 is configured to provide an additional heating effect to the air that is then forced to move over the inner facing surface of the panoramic roof panel 904; the additional heating effect improves performance for defrosting the panoramic roof panel 904 relatively more quickly.

The heating effect provided by the first stage 400 may be improved for the case where access to the heat from the engine block is provided soon after the engine starts; this arrangement may increase structural and functional complexity but may be more efficient for thermal management of the panoramic roof panel 904.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:
1. An apparatus, comprising:
   a vehicle having a vehicle roof section;
   a panoramic roof panel being configured for operative installation to the vehicle roof section of the vehicle; and
   a panoramic roof panel thermal management module, including:
      a connection structure being configured to connect the panoramic roof panel thermal management module proximate to the panoramic roof panel once the panoramic roof panel thermal management module is installed to the vehicle; and
      a roof panel heater assembly being supported by the connection structure, and the roof panel heater assembly being configured to provide heat to the panoramic roof panel once actuated to do just so; and
   the panoramic roof panel includes an interior-facing surface and an outer-facing surface being spaced apart from the interior-facing surface;
   the connection structure is configured to attach the roof panel heater assembly proximate to the panoramic roof panel and within the vehicle; and the roof panel heater assembly includes:
an air-moving module being configured to move air toward the interior-facing surface of the panoramic roof panel; and
the roof panel heater assembly further includes:
a heat-source module being positioned proximate to an output of the air-moving module, and the heat-source module being configured to: receive the air being moved by the air-moving module; impart heat to the air being received from the air-moving module; and permit movement of the air being heated toward the interior-facing surface of the panoramic roof panel; and
the roof panel heater assembly further includes:
an air-diffuser module being positioned proximate to the output of the heat-source module, and the air-diffuser module being configured to diffuse the air received from the heat-source module in such a way that the air is directed by the air-diffuser module to the interior-facing surface of the panoramic roof panel in a diffuse manner; and
a retractable roof liner section is operatively installed relative to a vehicle frame;
an air gap is defined between the panoramic roof panel and the retractable roof liner section once the retractable roof liner section is operatively closed; and
the roof panel heater assembly is configured to provide forced air generation, a heating effect, and diffused air flow to be applied to the panoramic roof panel via the air gap.

2. An apparatus for a panoramic roof panel being configured for operative installation to a vehicle roof section of a vehicle, comprising:
a panoramic roof panel thermal management module, including:
a connection structure being configured to connect the panoramic roof panel thermal management module proximate to the panoramic roof panel once the panoramic roof panel thermal management module is installed to the vehicle; and
a roof panel heater assembly being supported by the connection structure, and the roof panel heater assembly being configured to provide heat to the panoramic roof panel once actuated to do just so; and
the panoramic roof panel includes an interior-facing surface and an outer-facing surface being spaced apart from the interior-facing surface;
the connection structure is configured to attach the roof panel heater assembly proximate to the panoramic roof panel and within the vehicle; and
the roof panel heater assembly includes:
an air-moving module being configured to move air toward the interior-facing surface of the panoramic roof panel; and
the roof panel heater assembly further includes:
a heat-source module being positioned proximate to an output of the air-moving module, and the heat-source module being configured to: receive the air being moved by the air-moving module; impart heat to the air being received from the air-moving module; and permit movement of the air being heated toward the interior-facing surface of the panoramic roof panel; and
the roof panel heater assembly further includes:
an air-diffuser module being positioned proximate to the output of the heat-source module, and the air-diffuser module being configured to diffuse the air received from the heat-source module in such a way that the air is directed by the air-diffuser module to the interior-facing surface of the panoramic roof panel in a diffuse manner; and
a retractable roof liner section is operatively installed relative to a vehicle frame;
an air gap is defined between the panoramic roof panel and the retractable roof liner section once the retractable roof liner section is operatively closed; and
the roof panel heater assembly is configured to provide forced air generation, a heating effect, and diffused air flow to be applied to the panoramic roof panel via the air gap.

3. The apparatus of claim 2, wherein:
the roof panel heater assembly includes a flat heating element;
the connection structure includes an adherent material being configured to adhere the flat heating element to the interior-facing surface of the panoramic roof panel; and
the flat heating element is configured to convey the heating effect to the panoramic roof panel, and in response, the interior-facing surface of the panoramic roof panel receives the heat from the flat heating element, and the heat is conveyed from the interior-facing surface to the outer-facing surface of the panoramic roof panel in such a way that the heat conveyed to the outer-facing surface is sufficient enough to soften, at least in part, ice and snow resting on the outer-facing surface of the panoramic roof panel.

4. The apparatus of claim 2, wherein:
the roof panel heater assembly includes a flat heating element; and
the flat heating element includes:
a grouping of heating lines spaced apart from each other, and spanning across an inner surface of the panoramic roof panel.

5. The apparatus of claim 2, wherein:
the roof panel heater assembly includes a flat heating element; and
the flat heating element includes:
a light-transmissive heating element having an electrically-conductive sheet embedded in the panoramic roof panel.

6. The apparatus of claim 3, wherein:
the panoramic roof panel thermal management module further includes:
an air-moving device being configured to generate and direct a flow of air to be directed toward an inner facing surface of the panoramic roof panel for condensation mitigation of the panoramic roof panel.

7. The apparatus of claim 3, wherein:
the panoramic roof panel thermal management module further includes:
an air-moving device being positioned in front of the panoramic roof panel and at a top portion of a windshield of the vehicle.

8. The apparatus of claim 3, wherein:
the panoramic roof panel thermal management module further includes:
an air-moving device including:
an air diffuser device being positioned proximate to the panoramic roof panel;
an air generator being positioned in an engine compartment of the vehicle;
a fresh air intake being positioned in the engine compartment of the vehicle, and being operatively coupled to the air generator, and being configured to convey fresh air to the air generator; and an air duct extending from the air generator through the interior of the vehicle and toward the air diffuser device, and the air duct being fluidly connected to an air channel that leads to the air diffuser device; and wherein the air generator is deployed in the engine compartment of the vehicle, and is configured to blow forced air toward the panoramic roof panel by channeling air from a front section to a back section of the vehicle, thereby providing the heating effect to the panoramic roof panel.

9. The apparatus of claim 2, wherein:
an air passageway is defined through the air-moving module, the heat-source module and the air-diffuser module once aligned with each other and mounted to the vehicle frame of the vehicle.

10. The apparatus of claim 2, wherein:
the air-moving module is mounted proximate to the top of a front windshield of the vehicle.

11. The apparatus of claim 2, wherein:
the air-moving module includes any one of a fan unit and a blower unit.

12. The apparatus of claim 2, wherein:
the roof panel heater assembly further includes:
a front air duct; and
a forced air generator fluidly connected to the front air duct, and configured to generate forced movement of air through the front air duct, and the front air duct being operatively connected to the forced air generator; and
a front air channel operatively connected to the front air duct in such a way as to receive the forced movement of air from the front air duct; and
the front air duct is configured to convey forced air to the roof panel heater assembly.

13. The apparatus of claim 2, wherein:
the connection structure is configured to attach the roof panel heater assembly proximate to the panoramic roof panel and within the vehicle; and
the roof panel heater assembly includes:
a first stage including a pre-heating device being mounted proximate to an engine block of the vehicle; and
a second stage; and
a conduit structure being configured to fluidly communicate the first stage with the second stage.

14. The apparatus of claim 13, wherein:
the second stage includes:
the air-moving module, in which the air-moving module is configured to move air toward the interior-facing surface of the panoramic roof panel; and
the heat-source module, in which the heat-source module is positioned proximate to the output of the air-moving module, and the heat-source module is being configured to: receive the air being moved by the air-moving module; impart heat to the air being received from the air-moving module; and permit movement of the air being heated toward the interior-facing surface of the panoramic roof panel; and
the air-diffuser module, in which the air-diffuser module is positioned proximate to the output of the heat-source module, and the air-diffuser module is configured to diffuse the air received from the heat-source module in such a way that the air is directed by the air-diffuser module to the interior-facing surface of the panoramic roof panel in a diffuse manner.

15. The apparatus of claim 14, wherein:
the second stage further includes:
the roof panel heater assembly that includes a flat heating element; and
the connection structure that includes an adherent material being configured to adhere the flat heating element to the interior-facing surface of the panoramic roof panel; and
the flat heating element is configured to convey the heating effect to the panoramic roof panel, and in response, the interior-facing surface of the panoramic roof panel receives the heat from the flat heating element, and the heat is conveyed from the interior-facing surface to the outer-facing surface of the panoramic roof panel in such a way that the heat conveyed to the outer-facing surface is sufficient enough to soften, at least in part, ice and snow resting on the outer-facing surface of the panoramic roof panel.

16. A method for a vehicle having a vehicle roof section, and a panoramic roof panel being configured for operative installation to the vehicle roof section of the vehicle, the method comprising:
connecting a panoramic roof panel thermal management module having a roof panel heater assembly proximate to the panoramic roof panel, and the roof panel heater assembly being configured to provide heat to the panoramic roof panel once actuated to do just so and once the panoramic roof panel thermal management module is installed to the vehicle, and
in which the panoramic roof panel includes an interior-facing surface and an outer-facing surface being spaced apart from the interior-facing surface, and
in which the roof panel heater assembly includes an air-moving module being configured to move air toward the interior-facing surface of the panoramic roof panel, and
in which the roof panel heater assembly further includes a heat-source module being positioned proximate to an output of the air-moving module, and the heat-source module being configured to: receive the air being moved by the air-moving module; impart heat to the air being received from the air-moving module; and permit movement of the air being heated toward the interior-facing surface of the panoramic roof panel, and
in which the roof panel heater assembly further includes an air-diffuser module being positioned proximate to the output of the heat-source module, and the air-diffuser module being configured to diffuse the air received from the heat-source module in such a way that the air is directed by the air-diffuser module to the interior-facing surface of the panoramic roof panel in a diffuse manner; and
installing a retractable roof liner section relative to a vehicle frame; and
defining an air gap between the panoramic roof panel and the retractable roof liner section once the retractable roof liner section is operatively closed, in which the roof panel heater assembly is configured to provide forced air generation, a heating effect, and diffused air flow to be applied to the panoramic roof panel via the air gap.

17. The apparatus of claim 1, wherein:
the roof panel heater assembly includes a flat heating element; and
the connection structure includes an adherent material being configured to adhere the flat heating element to the interior-facing surface of the panoramic roof panel; and
the flat heating element is configured to convey the heating effect to the panoramic roof panel, and in response, the interior-facing surface of the panoramic roof panel, in use, receives the heat from the flat heating element, and the heat is conveyed from the interior-facing surface to the outer-facing surface of the panoramic roof panel in such a way that the heat conveyed to the outer-facing surface is sufficient enough to soften, at least in part, ice and snow resting on the outer-facing surface of the panoramic roof panel.

18. The apparatus of claim 1, wherein:
the flat heating element includes both or any one of:
a grouping of heating lines spaced apart from each other, and spanning across an inner surface of the panoramic roof panel; and
a light-transmissive heating element having an electrically-conductive sheet embedded in the panoramic roof panel.

19. The apparatus of claim 1, wherein:
the panoramic roof panel thermal management module further includes:
an air-moving device being configured to generate and direct a flow of air to be directed toward an inner facing surface of the panoramic roof panel for condensation mitigation of the panoramic roof panel; and
the air-moving device being positioned in front of the panoramic roof panel and at a top portion of a windshield of the vehicle; and
wherein the air-moving device includes:
an air diffuser device being positioned proximate to the panoramic roof panel; and
an air generator being positioned in an engine compartment of the vehicle; and
a fresh air intake being positioned in the engine compartment of the vehicle, and being operatively coupled to the air generator, and being configured to convey fresh air to the air generator; and
an air duct extending from the air generator through the interior of the vehicle and toward the air diffuser device, and the air duct being fluidly connected to an air channel that leads to the air diffuser device.

20. The apparatus of claim 1, wherein:
the roof panel heater assembly further includes:
a front air duct; and
a forced air generator fluidly connected to the front air duct, and configured to generate forced movement of air through the front air duct, and the front air duct being operatively connected to the forced air generator; and
a front air channel operatively connected to the front air duct in such a way as to receive the forced movement of air from the front air duct; and
the front air duct is configured to convey forced air to the roof panel heater assembly.

* * * * *